United States Patent [19]

Tozune et al.

[11] 4,147,898

[45] Apr. 3, 1979

[54] RECORDING AND/OR REPRODUCING APPARATUS MODE CONTROL SYSTEM

[75] Inventors: Toshimasa Tozune, Kawaguchi; Hisashi Hanzawa, Tokyo, both of Japan

[73] Assignee: Sony Corporation, Tokyo, Japan

[21] Appl. No.: 776,176

[22] Filed: Mar. 10, 1977

[30] Foreign Application Priority Data

Mar. 12, 1976 [JP] Japan .................................. 51-27284

[51] Int. Cl.$^2$ ...................... G11B 15/32; G11B 31/00
[52] U.S. Cl. ............................. 179/100.11; 242/189; 360/74.1
[58] Field of Search ................... 179/100.11; 360/137, 360/74; 242/189, 190, 201; 74/483 PB

[56] References Cited

U.S. PATENT DOCUMENTS

| | | | |
|---|---|---|---|
| 3,531,575 | 9/1970 | Kobler et al. ...................... 360/74 X |
| 3,770,281 | 11/1973 | Walburn ........................... 360/137 X |
| 3,861,620 | 1/1975 | Sekiguchi ............................. 242/189 |
| 3,916,122 | 10/1975 | Sato et al. ......................... 179/100.11 |
| 3,946,436 | 3/1976 | Takashino ............................... 360/74 |
| 3,967,796 | 7/1976 | Naito ..................................... 242/189 |
| 4,026,496 | 5/1977 | Kaneda ................................. 242/201 |

*Primary Examiner*—Bernard Konick
*Assistant Examiner*—Donald McElheny, Jr.
*Attorney, Agent, or Firm*—Lewis H. Eslinger; Alvin Sinderbrand

[57] ABSTRACT

A tape recording and/or reproducing apparatus using a tape cassette, or the like, includes a mechanism for detecting the end of the tape by detecting stopping of a tape reel mount and a change-over mechanism for placing the recording and/or reproducing apparatus, in response to the detection of the tape end, into an automatic shut-off operation, an automatic rewind operation, and an automatic repeat operation. An operating mechanism is also provided which cooperates with the drive for transporting the tape such that one of the automatic shut-off operation, automatic rewind operation and/or automatic repeat operation of the apparatus is effected with the operating mechanism in accordance with the selection of the change-over means, when the end of the tape is detected.

12 Claims, 43 Drawing Figures

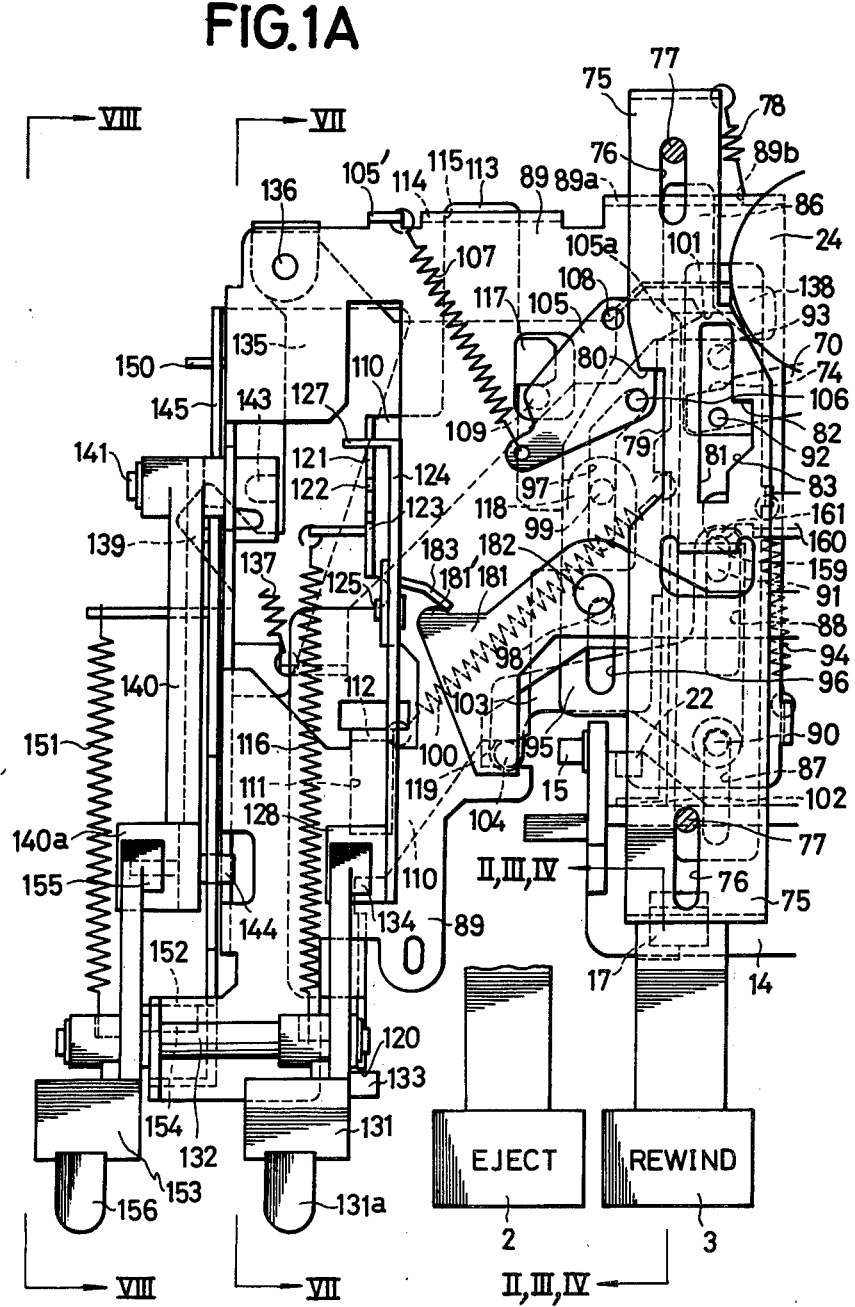

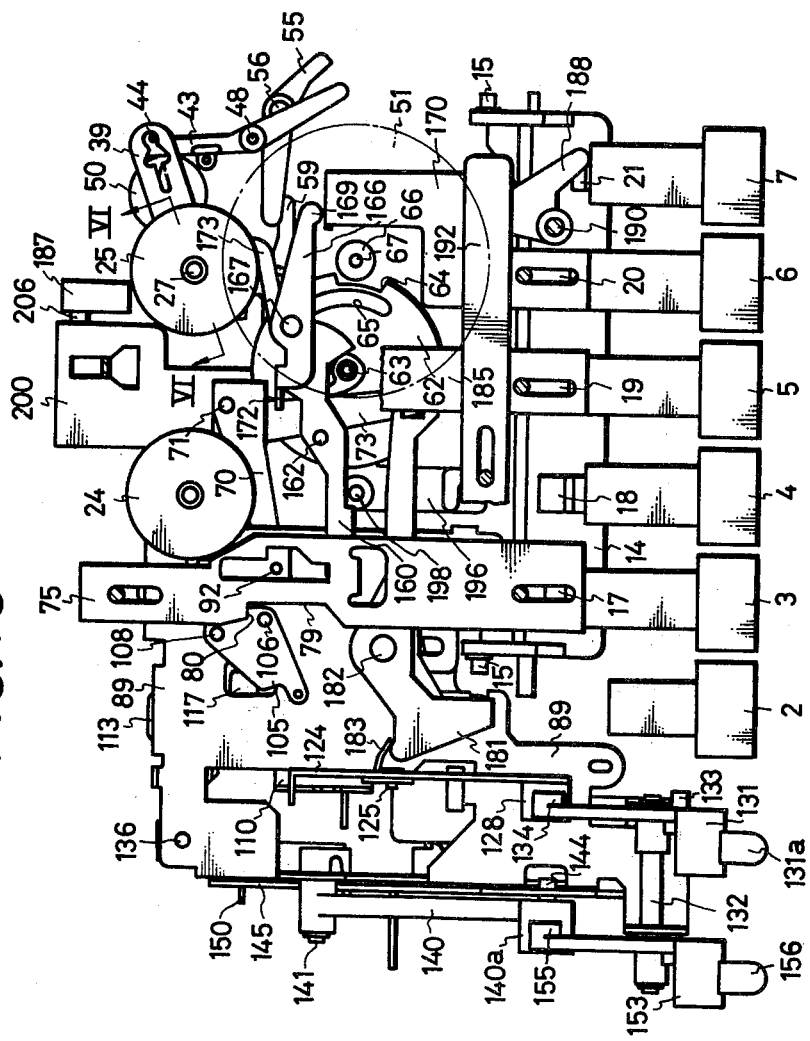

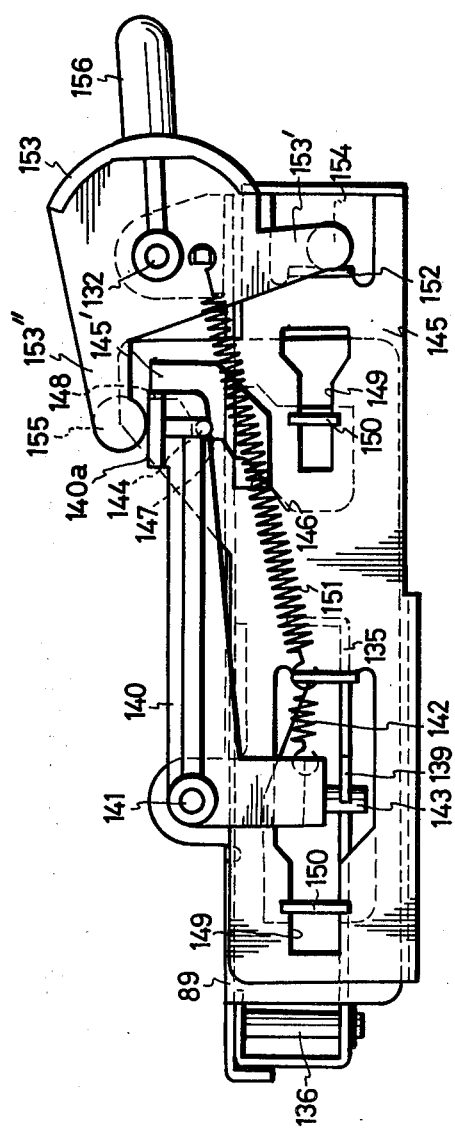

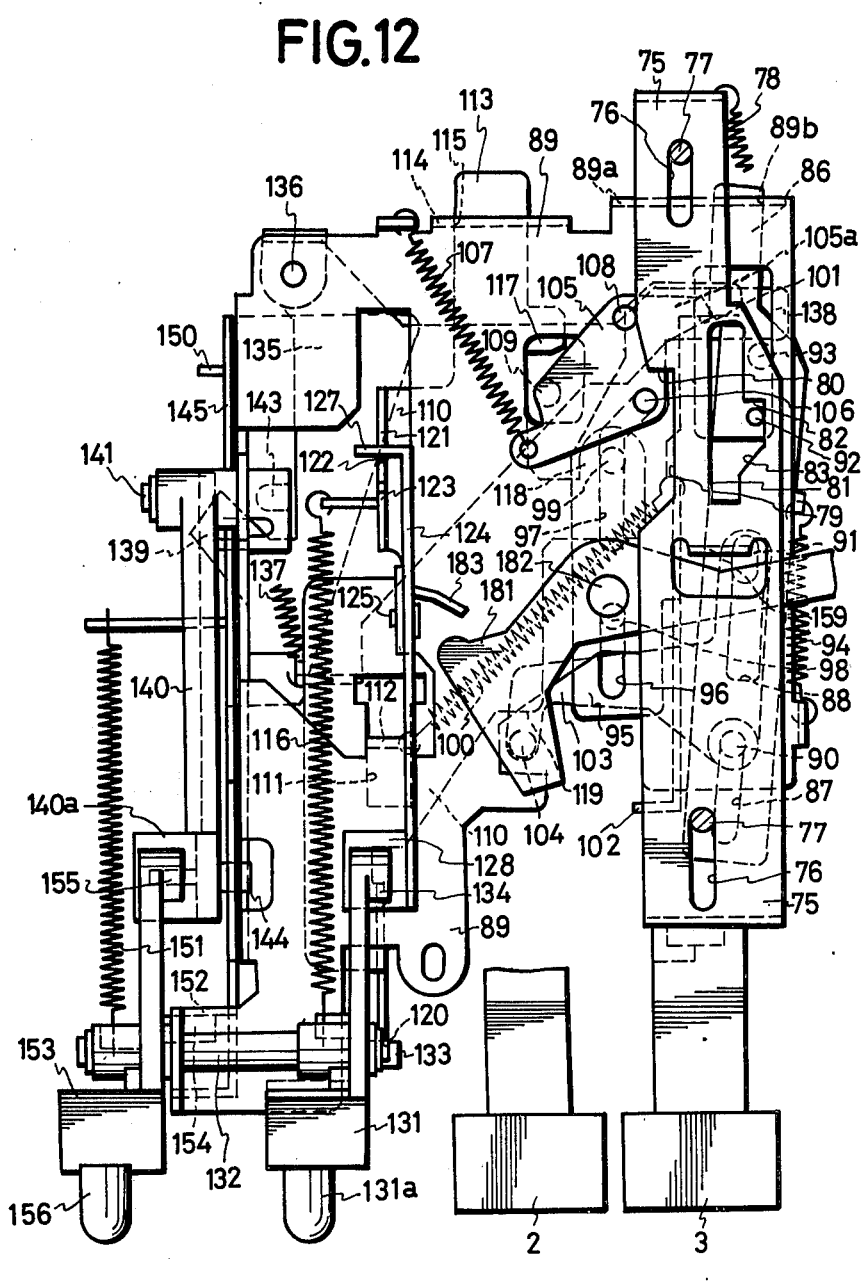

RECORDING AND/OR REPRODUCING APPARATUS MODE CONTROL SYSTEM

BACKGROUND OF THE INVENTION

1. Field of the Invention

The present invention relates to a recording and/or reproducing apparatus using a recording medium, and more particularly to a cassette type tape recording and/or reproducing apparatus wherein signals are recorded on and reproduced from a magnetic tape as the recording medium.

2. Description of the Prior Art

In cassette type tape recorders, a magnetic tape is transported from a supply reel to a take-up reel in the recording mode or in the reproducing or play back mode. When all of the magnetic tape is wound on the take-up reel, the tape recorder is manually changed to the stop mode, or automatically changed to the stop mode through a detection mechanism which detects the end of the magnetic tape. In some cases, where the apparatus is operating in the play mode and the end of the tape is detected, the tape recorder is changed to the rewind mode to rewind the magnetic tape from the take-up reel to the supply reel, so that the signals on the tape can be automatically repeated.

For convenience, tape recorders have been proposed which are automatically changed to the rewind mode with the detection of the tape end of the magnetic tape. However, in most such tape recorders, a tape end detection mechanism is related to a tape counter, and operating levers are actuated by a system controller and plunger-solenoids in response to detection of the tape end by the tape counter. Of course, to operate properly, the tape counter in such apparatus must be properly preset to detect the tape end in accordance with the length of the magnetic tape. One problem with such devices is, however, that because of the way in which the system controller and plunger-solenoids are arranged, the tape recorder must be very large-sized and costly.

SUMMARY OF THE INVENTION

It is an object of this invention is to provide a recording and/or reproducing apparatus in which an automatic shut-off operation, or automatic rewind operation and an automatic repeat operation can be effected by a simple preselection control which is convenient for use.

Another object of this invention is to provide a recording and/or reproducing apparatus in which the end of the recording medium is detected by detecting stoppage of a tape reel mount, so that the end of the recording medium or tape is surely detected regardless of the length of the recording medium and of the transport speed of the recording medium.

A further object of this invention is to provide a recording and/or reproducing apparatus which is compact in construction and inexpensive to manufacture.

In accordance with an aspect of the present invention, a recording and/or reproducing apparatus for use with a recording medium, such as magnetic tape in a cassette, includes means for detecting the end of the recording medium by detecting the stoppage of a tape reel mount in the apparatus. A change-over or selection mechanism is provided for selecting the desired operating mode of the recording and/or reproducing apparatus, i.e., to either an automatic shut-off operation, or automatic rewind operation, or an automatic repeat operation upon detection of the tape end. An operating mechanism, cooperates with the drive for transporting the recording medium and is responsive to the selection of the change-over mechanism to place the recording and/or reproducing apparatus in one of the desired operating modes when the end of the recording medium is detected.

By the device of this invention, the end of the recording medium is surely detected regardless of the length of the recording medium. And since the automatic repeat operation can be effected, the apparatus is convenient for use.

The above and other objects, features and advantages of this invention will become apparant from the following detailed description of an illustrative embodiment thereof shown in the accompanying drawings.

BRIEF DESCRIPTION OF THE DRAWINGS

FIG. 1A and FIG. 1B, when assembled as shown in FIG. 25, is a partial plan view of the control mechanism of a tape recorder and radio receiver according to one embodiment of this invention, showing the positions of the various elements thereof in the stop mode of the tape recorder:

FIG. 1C is a reduced plan view of the control mechanism shown in FIG. 1A - 1B;

FIG. 8 is a cross sectional view taken along line VIII — VIII of FIG. 1A;

FIG. 12 is a plan view of a part of the control mechanism of the present invention in which a changeover slide used therein is moved forward by one step;

FIG. 25 is a view illustrating the manner in which FIG. 1A and FIG. 1B are assembled;

FIG. 26 is a view illustrating the manner in which FIG. 9A and FIG. 9B are assembled;

FIG. 27 is a view illustrating the manner in which FIG. 13A and FIG. 13B are assembled;

FIG. 28 is a view illustrating the manner in which FIG. 15A and FIG. 15B are assembled;

FIG. 29 is a view illustrating the manner in which FIG. 18A and FIG. 18B are assembled;

FIG. 30 is a view illustrating the manner in which FIG. 20A and FIG. 20B are assembled;

FIG. 31 is a view illustrating the manner in which FIG. 22A and FIG. 22B are assembled;

FIG. 32 is a view illustrating the manner in which FIG. 23A and FIG. 23B are assembled; and FIG. 33 is a view illustrating the manner in which FIG. 24A and FIG. 24B are assembled.

DESCRIPTION OF THE PREFERRED EMBODIMENTS

Figure 2:
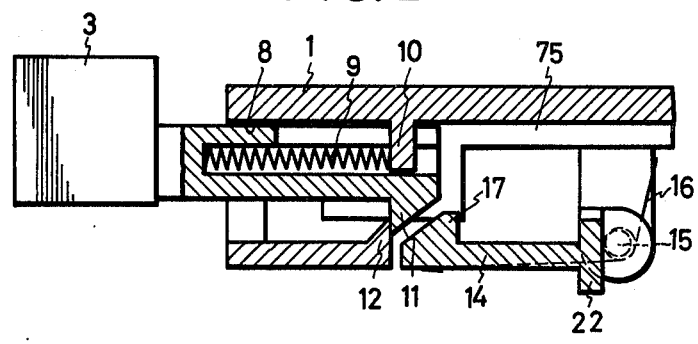
FIG. 2 is a cross sectional view taken along line II — II of FIG. 1A.
Figure 3:
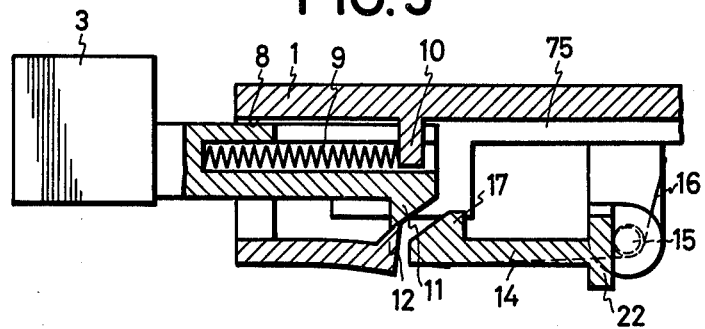
FIG. 3 is a cross sectional view taken along the III — III of FIG. 1A.
Figure 4:
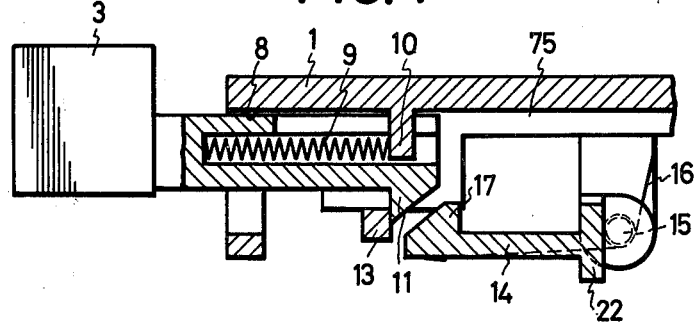
FIG. 4 is a cross sectional view taken along line IV — IV of FIG. 1A.

Referring now to the drawings in detail, a control mechanism for a cassette type tape recorder having a built in radio receiver is illustrated in FIG. 1 with the housing and other non-essential parts of the tape recorder removed for clarity of illustration. The control mechanism includes an eject push button 2, a rewind push button 3, a stop push button 4, a reproducing or play push button 5, a fast forward push button 6 and a record push button 7 all arranged in a line at the front side of a mechanical deck or chassis, (FIG. 2 to FIG. 4). Push buttons 2 – 7 are slidably supported in guide holes 8 formed in the front edge of mechanical desk 1. For example, as shown in FIG. 2, rewind push button 3 is slidable supported in the hole 8. A coil spring 9 extends between rewind push button 3 and a downwardly extending projection 10 on mechanical deck 1 and urges push button 3 toward its original position. A lock projection 11, having a right triangular cross section, is formed on the inner end of rewind push button 3, and the normal inactive position of the push button 3 is maintained, against the bias of spring 9 by engagement of lock projection 11 with a stop 12 formed in deck 1.

Mechanical deck or chassis 1 is formed of synthetic resin, so that stop 12 is elastically deformable, as seen in FIG. 3. Thus, when rewind push button 3 is assembled into mechanical deck 1, stop 12 is deformed by lock projection 11 so that lock projection 11 can be moved upwardly past stop 12. With this construction, the assembling operation is simplified and number of parts is reduced.

If desired, stop 12 may be broken away and a metallic bar 13 inserted in mechanical deck 1, as shown on FIG. 4 to limit outward movement of the push buttons under the influence of their springs 9. In this form metallic bar 13 is supported by supporting portions (not shown) formed in deck 1.

A locking plate 14 for locking push buttons 3, 5, 6 and 7 with their operative positions is shown in FIG. 2 – 5. The locking plate 14 is rotatably supported through integral end pins 15 in mechanical deck 1, and it is urged in a clockwise direction (FIG. 2) about pins 15, in the locking direction, by torsion springs 16 adjacent each of the pins. Five projections 17, 18, 19, 20 and 21 are formed on the upper surface of locking plate 14 in respective association with the push buttons 3 – 7. The first projection 17 is arranged to lock rewind push button 3 in its operative-inner position by engagement with the lock projection 11 of the rewind push button.

Projection 18 is arranged as to cooperate with the lock or release projection 11 of stop push button 4. When stop push button 4 is depressed (moved inwardly), locking plate 14 is rotated in a counter-clockwise direction (FIG. 2) around the pins 15 against the bias of springs 16. Since the cross section of projection 18 is that of an isosceles triangle stop push button 4 is not locked by projection 18 and simply serves to release any previously depressed push button.

Projection 19 is arranged to lock the reproducing or play push button 5 while projection 20 and projection 21 are arranged to lock fast forward push button 6 and record push button 7, respectively.

Figure 5:
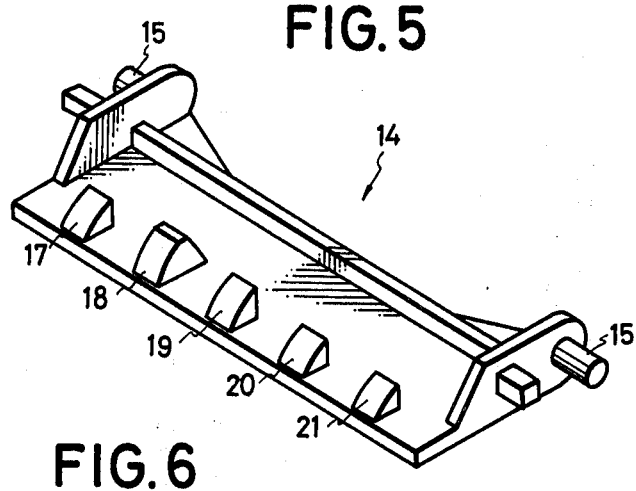
FIG. 5 is a perspective view of a locking plate; used in the control mechanism for the present invention.

Projections 17 to 21 are different in height, as seen in FIG. 5. Projection 18 is the highest and projection 19 is higher than projections 17 and 20, while projection 21 is the lowest. The preferential order of push buttons 3 to 7 is decided by the height, i.e., a push button corresponding to the lower projection is released from locking engagement with plate 14 when another push button corresponding to a higher projection is depressed.

An integral downwardly extending pin 22 is formed on locking plate 14 (FIG. 2) for control by the shut-off operation to be described below. In the shut-off operation, locking plate 14 is rotated through pin 22 as below described, in the same manner as when stop push button 4 is depressed, thereby to release all of the push buttons and shut off the apparatus.

Figure 6:
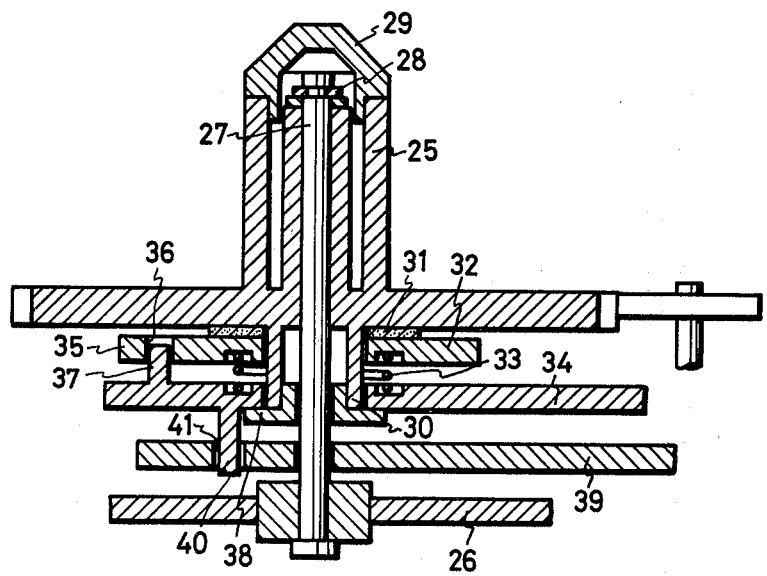
FIG. 6 is a partial cross sectional view of a reel mount taken along line VI — VI in FIG. 1C.

The mechanism used to detect the end of the tape in the control mechanism of the present invention is associated with a take-up reel mount 25 of the tape recording and reproducing device, as shown in FIG. 6. As seen therein a support shaft 27 is fixed on an auxiliary base plate 26 of chassis 1 and rotatably supports the take-up reel mount 25. A conventional E-shaped ring 28 is arranged on the end of support shaft 27 to prevent reel mount 25 from being inadvertently removed from support shaft 27. A cap 29 is mounted on the top end of reel mount 25, while a downwardly extending boss 30 is formed on the lower surface of the reel mount.

A noise preventing ring 31 formed of a low friction material such as polytetrafluoroethylene (sold under the trademark TEFLON) is positioned between the lower surface of mount 25 and an annular spring receiver 32 on boss 30. A coil spring 33 surrounds boss 30 below receiver 32 and above an intermediate lever 34. Spring receiver 32 includes an arm 35 having an opening 36 formed therein which receives a pin 37 fixed on one end of intermediate lever 34. And, a locking ring 38 having an integral annular flange is secured to the lower end of boss 30, thereby to prevent intermediate lever 34 from falling off the lower end of the boss 30.

A detecting lever 39 is rotatably mounted on support shaft 27 below intermediate lever 34 and has a hole 41 formed in one end thereof which receives a pin 40 projecting downwardly from intermediate lever 34. The opposite end of detecting lever 39 has a generally cross-shaped opening 42 formed therein (see FIG. 1B) which receives a pin 44 formed on one end of a swing lever 43. Opening 42 has a pocket 45 formed therein which receives pin 44 when the reel mount 25 is rotated in the normal, counter-clockwise play direction as viewed in FIG. 1B, while another pocket 46 receives pin 44 when reel mount 25 is rotated in the reverse or clockwise direction. A further pocket 47 is formed in opening 42 for receiving pin 44 when reel mount 25 stops.

As shown on FIG. 6, detecting lever 39 is supported by support shaft 27 fixed on auxiliary base plate 26, and it is not in direct contact with the reel mount 25. Thus, any pressure applied to detecting lever 39 through pin 44 from swing lever 43 is received by the support shaft 27 and no load is applied to reel mount 25. Accordingly reel mount 25 can smoothly rotate, with little power loss, even though rotation of lever 39 is blocked by the engagement of pin 44 is opening 42.

Figure 1B:
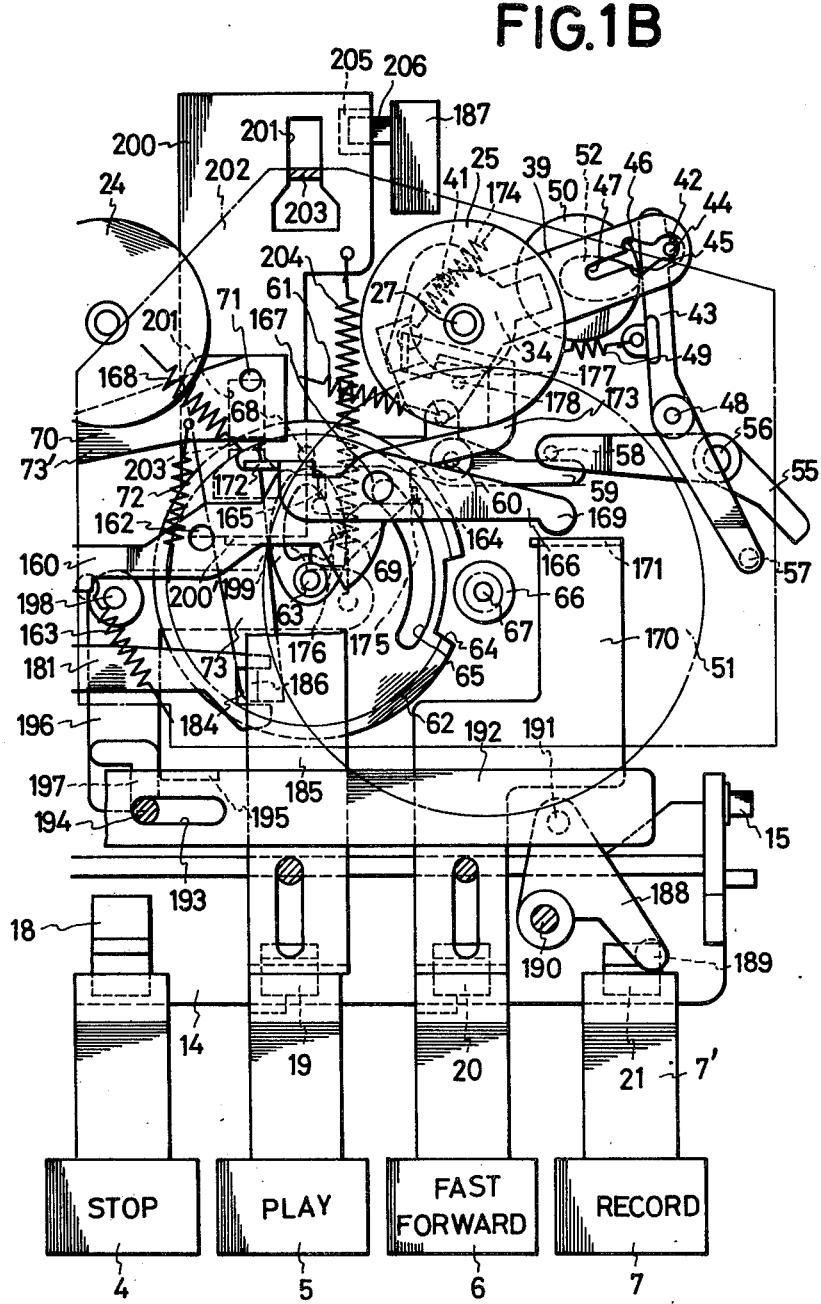

As shown on FIG. 1B, swing lever 43 is rotatably supported on a support pin 48 mounted in deck 1, and the lever is urged in the counter-clockwise direction in FIG 1B, around pin 48 by a coil spring 49 which is secured at one end to the lever and at its opposite end to deck 1. A cam gear 50 is rotatably mounted on deck 1 adjacent swinging lever 43 and is driven from a fly-wheel 51 through a belt and gear (not shown). The fly-wheel is part of the capstan drive of the recording and/or reproducing apparatus. The cam gear includes a generally oval shaped cam 52 formed on its upper surface and located to contact the side of swinging lever 43. By this arrangement when cam gear 50 rotates, swinging lever 43 swings alternately from right to left as seen in FIG. 1B.

An interconnecting lever 55 is pivotally mounted by a support pin 56 on auxiliary base plate 26 below swinging lever 43. One end (the right end in FIG. 1B) of interconnecting lever 55 is located to contact a downwardly extending pin 57 on the end of swinging lever 43 opposite pin 44. The other (left) end of lever 55 includes a downwardly extending pin 58 located to engage one end of a stop lever 59. The stop lever 59 is rotatably mounted by a support pin 60 on deck 1, and is urged in the counter-clockwise direction (FIG. 1B) around pin 60 by a coil spring 61 connected at opposite ends between lever 59 and deck 1.

A drive gear 62 is rotatably mounted on deck 1 by a support shaft 63 and is positioned above lever 49. Gear 62 has a tooth-less portion or segment 64 formed on its circumference and an arcuate opening 65 formed along its circumference so that the circumference of the drive gear can be deformed to absorb the shock when gear 62 starts to engage the drive pinion 66. Pinion 66 is fixed to a capstan 67 on which the fly-wheel 51 is secured.

Figure 9A:
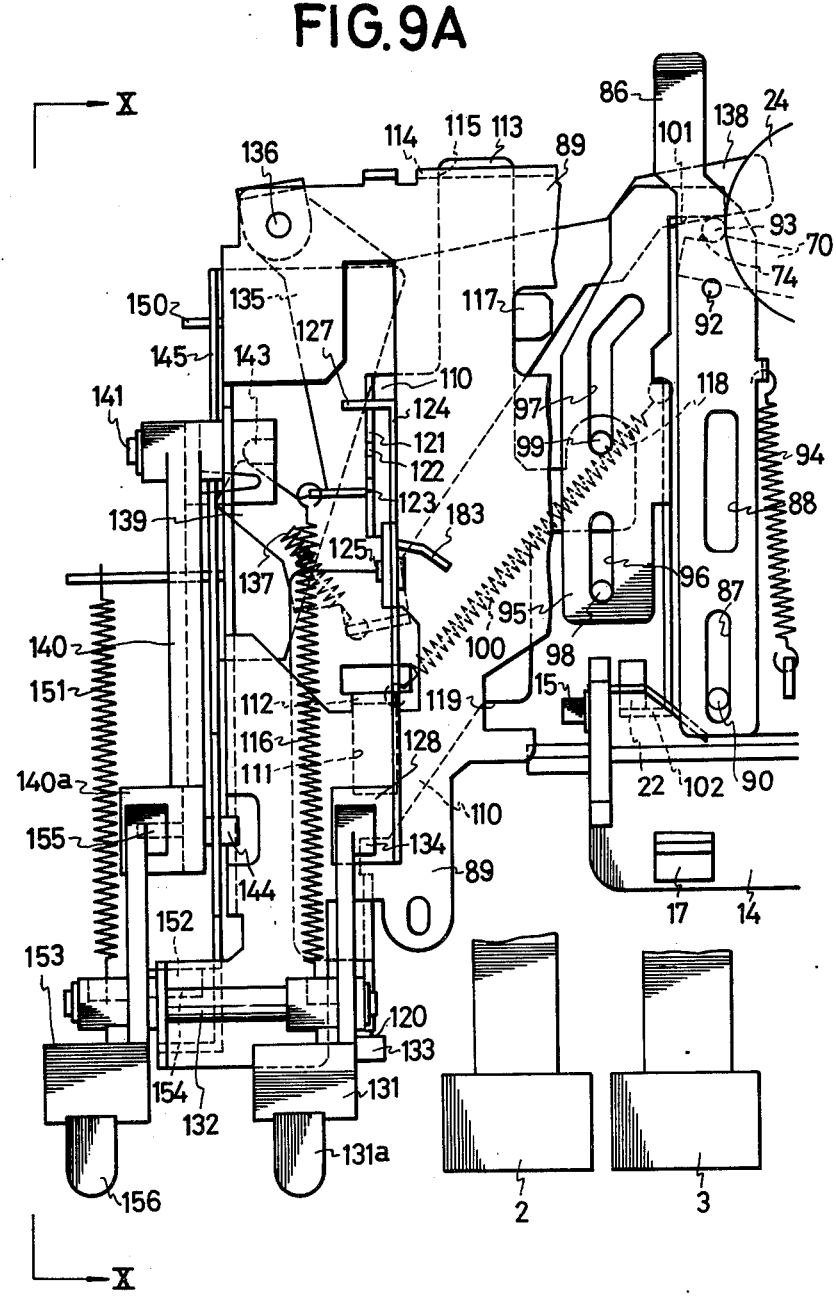
FIG. 9A and FIG. 9B, when assembled as shown in FIG. 26, is a plan view of the control mechanism of the present invention; showing the relative positions of the elements thereof when the tape recorder is in the automatic shut-off mode.
Figure 9B:
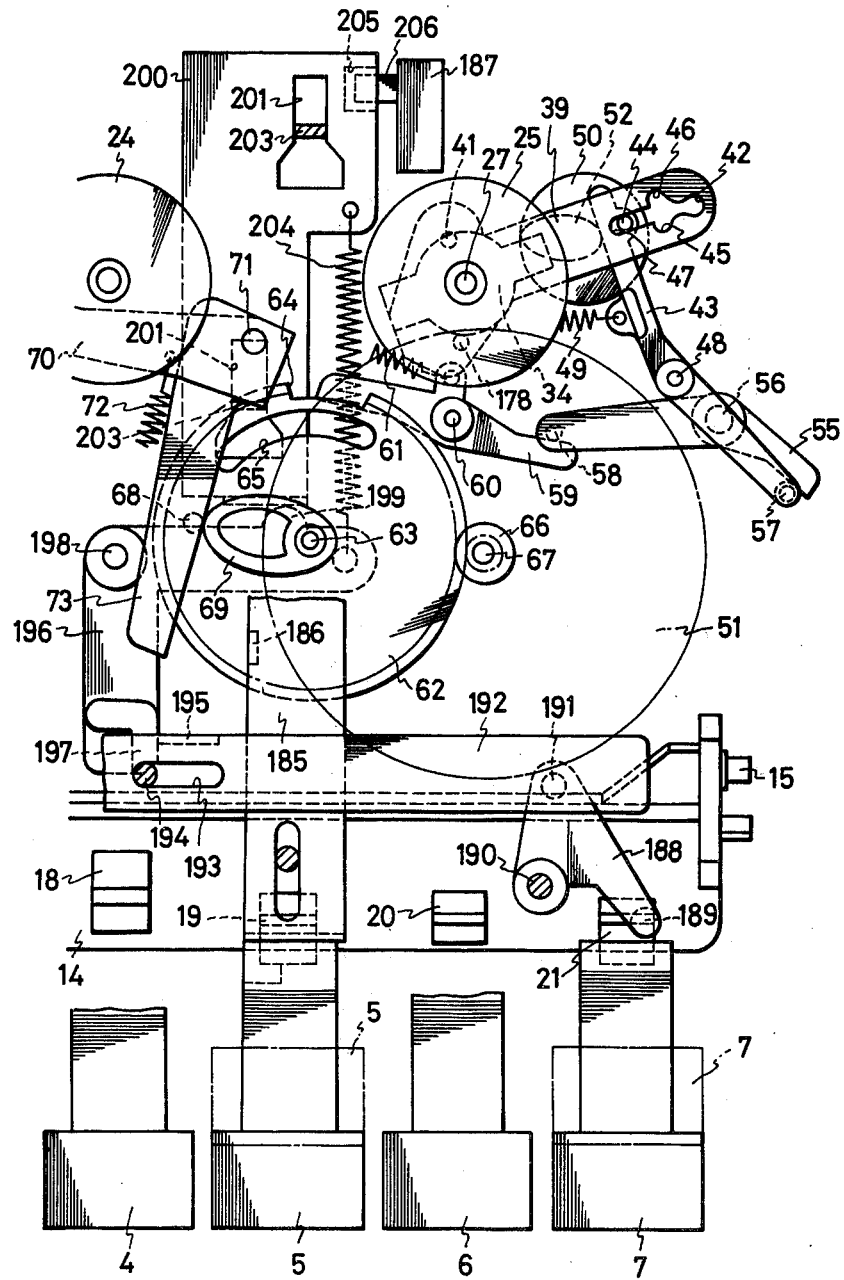

A pin 68 is secured to or integrally formed on the lower surface of drive gear 62, and a cam is formed integrally with the upper surface of drive gear 62 (see also FIG. 9B). The left end (FIG. 1B) of stop lever 59 is shaped to contact pin 68 on drive gear 62 and selectively block rotation of the drive gear, but that end of the lever can be selectively disengaged from pin 68 upon rotating lever 59, as described hereinafter.

An L-shaped shut-off lever 70 is pivotally mounted on deck 1 by a support shaft 71 and is located above drive gear 62, as seen in FIG. 1B. Lever 70 is urged in the counter-clockwise direction (FIG. 1B) about support shaft 71 by a coil spring 72 operatively connected at its opposite ends to lever 70 and to deck 1. By this arrangement, one arm 73 of L-shaped lever 70 is normally pressed against cam 69 of drive gear 62 to contact with the latter. The other arm 73' of lever 70 has a slant step 74 formed therein (FIG. 1A) which serves an important part in the control mechanism of the invention.

A rewind slide 75 is slidably mount in deck 1 to the left of the pivot 71 of shut-off lever 70. The slide has a pair of oblong holes 76 formed therein which receive a pair of pins 77 fixed on deck 1, thereby to slidably guide rewind slide 75. The latter is secured to push button 3 and is urged to its original or first position (in the downward direction of FIG. 1A) by a coil spring 78, connected at opposite ends to slide 75 and deck 1. Thus, when rewind push button 3 is depressed, rewind slide 75 slides forward (upward in FIG. 1A.)

A cut-out portion 79 is formed in one edge of rewind slide 75 and includes a step 80 which is used to lock the slide, as described hereinafter, in the automatic rewind operation. A cam opening 81 is also formed in the rewind slide 75, which includes a horizontal step 82 and a slant surface 83. The horizontal step 82 is selectively engaged with a pin 92 of an operating slide 86 which slides or moves rewind slide 75 inwardly against the bias of spring 78 for the automatic rewind operation. The slant surface 83 serves to rotate the operating slide 86 when rewind slide is moved back to its original position, as described hereinafter.

Figure 7:
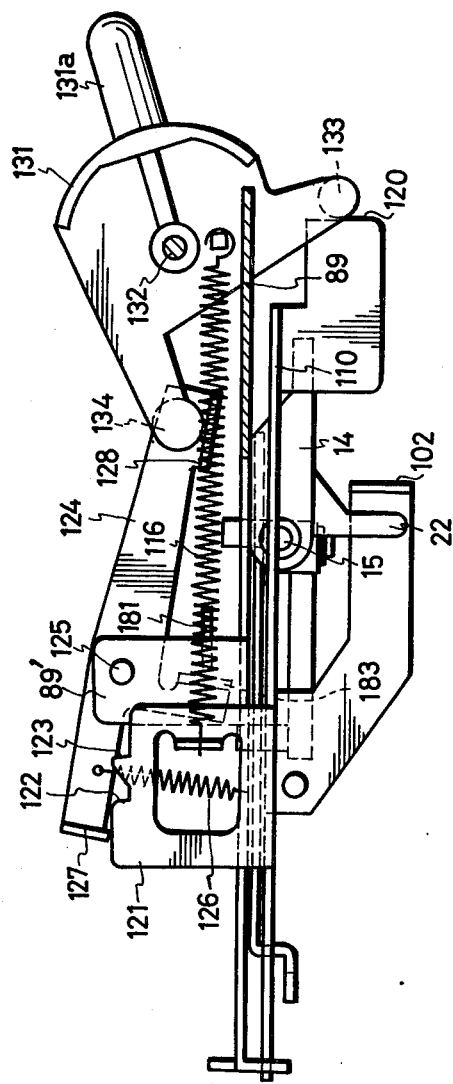
FIG. 7 is a cross sectional view taken along line VII — VII of FIG. 1A.

A change-over or selection mechanism, arranged at the left side of rewind slide 75 (FIG. 1A), is shown in detail in FIGS. 7 and 8. The change-over or selection mechanism permits the operator to preset the recording and reproducing apparatus in an automatic shut-off mode, an automatic rewind mode and an automatic repeat mode to be effected when the end of the tape is detected. In addition, the change-over or selection mechanism can preset the recording and reproducing apparatus to automatically shut off a radio receiver in the apparatus from which signals are being recorded when the end of the tape is detected.

The change-over mechanism cooperates with the operating slide 86 which is located beneath rewind slide 75 to operate the latter. A pair of oblong holes 87 and 88 (FIG. 1A) are formed in operating slide 86. A pin 90 secured to on auxiliary base plate 89 in deck 1 and another pin 91 secured a change-over lever of the change-over mechanism are respectively received in holes 87 and 88 to slidably guide operating slide 86 in the backward and forward or inner and outer directions. An inner end of operating slide 86 is inserted through an oblong opening 89b formed in a bent end or tab 89a of auxiliary base plate 89.

Slide 86 includes a pair of integral pins 92, 93 respectively located on the upper and lower surfaces of the slide 86. Pin 92 is received in cam opening 81 while pin 93 is located opposite to the slant step 74 of shut-off lever 70. A coil spring 94 engaged at its opposite ends betwen operating slide 86 and auxiliary base plate 89 biases the operating slide 86 to its forward or outer position shown in FIG. 1A.

A shut-off slide 95 is located to the left of operating slide 86, as seen in FIG. 1A, and has a pair of holes or slots 96, 97 formed therein. Slot 96 is generally straight and oblong, while slot 97 has a bend formed therein. These slots respectively receive a pin 98 fixed on auxiliary base plate 89 and a pin 99 fixed on the change-over slide (described below) of the change-over mechanism to slidably guide shut-off slide 95. A coil spring 100 is operatively engaged at its ends shut-off slide 95 and auxiliary base plate 89 to urge the shut-off slide 95 to its normal position shown in FIG. 1A wherein pin 98 engages the inner end of slot 96. Slide 95 has an L-shaped inner end portion 101 and an actuating extension 102 on one of its side edges near the front end of deck 1. The front end of the actuating extension 102 is bent, as seen in FIG. 9A, to engage pin 22 of locking plate 14 and thus rotate the locking plate to release push buttons 3 – 7 when plate 95 is moved inwardly toward the rear of deck 1.

A generally L-shaped change-over lever 103 (FIG. 1A) is located beneath shut-off slide 95, and is rotatably supported on pin 90 in any convenient manner. The pin 91 received in the hole 88 of operating slide 86 is secured on one end of change-over lever 103. The hole or slot 88 in plate 86 has a width which is somewhat greater than the width of pin 91 so that there is some clearance between pin 91 and the oblong hole 88 in the lateral direction. On the other leg of lever 103 a pin 104 is provided which extends upwardly from the lever to contact one edge of a change-over slide, described below.

A lock lever 105 (FIG. 1A) is located in deck 1 inwardly of change-over lever 103, and is rotatably supported on a support pin 106 secured to deck 1. A coil spring 107 is secured at its opposite ends between to lock lever 105 and to a tab 105' on plate 89 to urge the lock lever in the clockwise direction (FIG. 1A) about support pin 106. A lock pin 108 is mounted on lock lever 105 and serves to lock slide 75 in its inner position (see FIG. 13A) when it engages the step 80 of rewind slide 75. Another pin 109 on lock lever 105 extends downwardly from the lock lever to engage a portion of the change-over slide, described below, and thus restrict rotation of lock lever 105 by coil spring 107.

The change-over or selection mechanism includes a change-over slide 110 which controls operating slide 86 and shut-off slide 95. Slide 110 has an oblong hole 111 formed therein which receives a bent tab 112 extending down from base plate 89. The inner end 113 of slide 110 is received in an opening 115 formed in a bent tab portion 114 of auxiliary base plate 89, so that the change-over slide 110 is slidably guided in the backward and forward or inner and outer directions. A coil spring 116 is secured at its opposite ends to change-over slide 110 and an actuating or selecting lever 131 to urge slide 110 it its original or first position shown in FIG. 1A.

A projection 117 formed on change-over slide 110 is located to contact the previously described pin 109 of lock lever 105. An an L-shaped arm 118 formed in change-over slide 110 includes the previously described pin 99 which is received in the bent hole or slot 97 of shut-off slide 95. Slide 110 also includes a shoulder 119 which is located to contact pin 104 of change-over lever 103. And, a contact portion or extension 120 (FIG. 7) is formed on the front end of change-over slide 110 to contact the actuating or selecting lever 131 described below.

As shown on FIG. 7, slide 110 also includes an upstanding bent tab portion 121 having two shoulders or stops 122 and 123 formed therein on its upper edge. The shoulder 122 operates to place or change the tape recorder into the automatic rewind mode, and the other shoulder 123 operates to place or change the tape recorder into the automatic repeat mode, as described hereinafter.

A lock lever 124 is pivotally mounted on a piovot pin 125 secured in an upstanding tab 89' of plate 89 and has an inner end portion 127 located to selectively engage shoulders 122 and 123 of the tab 121 of change-over slide 110. Lock lever 124 is urged in the counter-clockwise direction (FIG. 7) about support pin 125 by a coil spring 126 which is connected at its opposite ends between the lever 124 and plate 89. The inner end of lever 124 is bent, (see FIG. 1A), to selectively engage the shoulders 122 and 123 of slide 110. The opposite end of lever 124 includes a horizontally bent tab or contact portion 128 which is used to selectively release lock lever 124, from shoulders 122, 123, as described hereinafter.

As shown in FIG. 7, the mode selection or actuating lever 131 is located in front of lock lever 124 and is rotatably mounted by a support pin 132 on auxiliary base plate 89. One end of coil spring 116 is engaged with lever 131 and urges the lever in the clockwise direction in FIG. 7 about support pin 132. Actuating lever 131 includes a horizontally extending pin 133 on one of its arms which contacts the contact portion 120 of change-over slide 110. The other arm of the generally L-shaped lever 131 includes a push portion 134 which is located to engage and push the horizontally bent tab portion 128 of lock lever 124. Finally, lever 131 includes an actuating knob or finger 131a.

As also seen in FIG. 1A, the recording and reproducing apparatus of the present invention includes a generally triangular radio release lever 135 located below change-over slide 110, and rotatably mounted by a pin 136 on the auxiliary base plate 89. A coil spring 137 operatively engaged at its opposite ends with lever 135 and plate 89 urges radio release lever 135 in the clockwise direction, (FIG. 1A) about pin 136. Lever 136 includes an integral arm 138 which is located opposite pin 93 on operating slide 86. And, a slant projection 139 is formed in radio release lever 135 in position to contact a lock lever 140 described below.

Referring now to FIGS. 1A and 8, lock lever 140 is illustrated as being located adjacent radio release lever 135. The lock lever is rotatably mounted by a pin 141 on auxiliary base plate 89, and a coil spring 142 urges the lock lever 140 in the counter-clockwise direction in FIG. 8 about pin 141. Lever 140 includes an integral pin 143 formed in one arm thereof which contacts with the slant projection 139 of radio release lever 135 (See FIG. 1A). Another pin 144 is formed integrally with the other arm of lock lever 140 and this pin serves to selectively lock the lever 140 in a predetermined position.

A lock slide 145 is located adjacent lock lever 140 (FIG. 1A and 8) and has a lock opening 145' formed therein. The lock opening 145' has three lock steps 146, 147 and 148.

First lock step 146 serves to lock the tape recorder in the mixing mode; second lock step 147 serves to lock the tape recorder in the OFF-state of the radio receiver; and third lock step 148 serves to lock the tape recorder in the ON-state of the radio receiver.

A pair of oblong holes 149 are formed in lock slide 145 which receive bent tab portions 150 of auxiliary base plate 89 that slidably support slide 145 in the apparatus. Slide 145 is urged in the rightward or outer direction (FIG. 8) by a coil spring 151 which is operatively engaged at its ends with slide 145 and a radio change-over lever 153, a bent tab position 152 formed on lock slide 145 is engaged with a push pin 154 on the radio change-over lever so that actuation of lever 153 will cause slide 145 to move.

Radio change-over lever 153 is rotatably supported by the common support or pivot pin 132 on plate 89 and is urged in the clockwise direction (FIG. 8) about pin 132 by its engagement with coil spring 151. The push pin 154 is formed on the downwardly extending arm 153 or radio change-over lever 153, to contact bent tab portion 152 of lock slide 145, and another pin 155 is formed on the lateral by extending arm 153 lever 153, to contact a lateral projection 140a of lock lever 140. Finally, lever 153 includes an actuating knob or finger tab 156.

The control mechanism of the present invention includes a shut-off prevention mechanism which prevents automatic shut-off when the apparatus is manually switched to the cue or review modes. This shut-off prevention mechanism is shown in FIGS. 1A and 1B wherein it is seen that a bent tab portion 159 is formed in the rewind slide 75 (FIG. 1A) which is located adjacent the left end 161 of an interconnecting lever 160 (FIG. 1B) which is rotatably supported by a support pin 162 fixed on the mechanical deck 1. Lever 160 is biased in a counter-clockwise direction about pin 162 by a coil spring 163 connected at its opposite ends to the deck 1 and lever 160. A stop tab 164 (See FIG. 23B) is formed on the opposite end of interconnecting lever 160 and a pushing projection 165 is formed thereon between tab 164 and pivot 162.

Figure 23A:
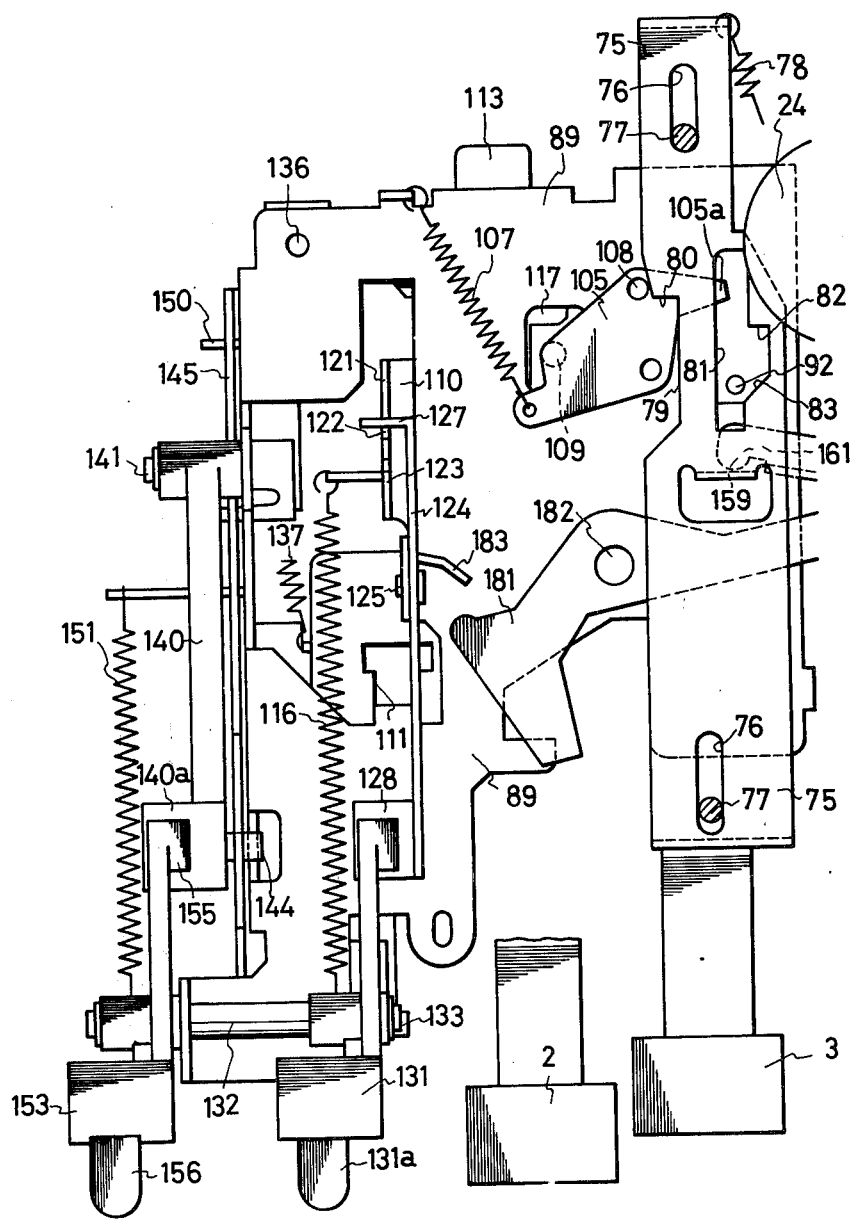
FIG. 23A and FIG. 23B, when assembled as shown in FIG. 32, is a plan view of the control mechanism of the present invention, illustrating the shut-off prevention mechanism in the cue mode and review mode.

The shut-off prevention mechanism also includes a second interconnecting lever 166 (FIG. 1B and 23) arranged to the right of interconnecting lever 160 and rotatably supported by a support pin 167 or deck 1. A coil spring 168 operatively connected at its ends between lever 166 and deck 1 biases lever 166 in the clockwise direction about pin 167. One end 169 of lever 166 is positioned to contact a pushing tab 171 formed on the top of a fast forward slide 170 secured to fast forward push button 6. The other end of lever 166 includes a bent tab 172 positioned to engage and push one end of interconnecting lever 160 when lever 166 rotates in a counter-clockwise direction (See FIG. 23B).

Figure 23B:
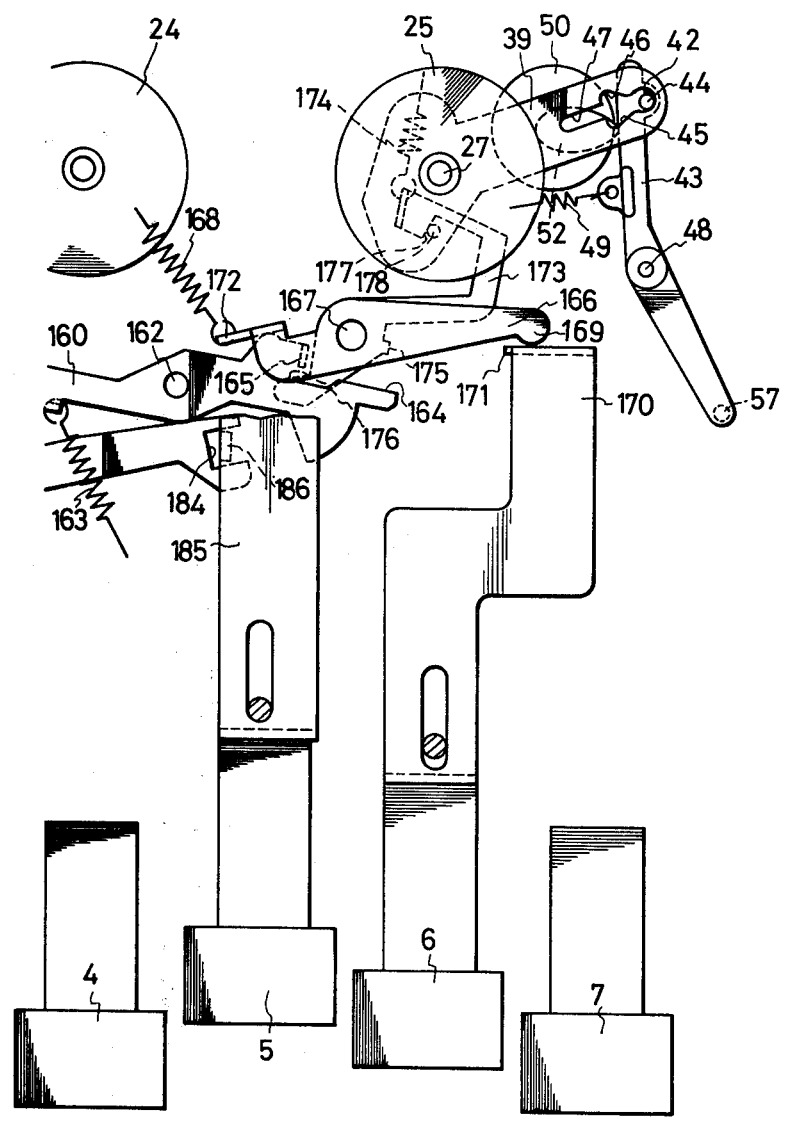

A shut-off regulating lever 173 is positioned below lever 166 and rotatably supported by the support pin 167 (FIG. 23B). A coil spring 174 operatively engaged between lever 173 and deck 1 biases lever 172 in the counter-clockwise direction about pin 167. Clockwise rotation of shut-off regulating lever 173 is restricted by contact of stop tab 164 of interconnecting lever 160 with a tab 174 formed in shut-off regulating lever 173.

One end 176 of lever 173 is positioned to engage and be pushed by pushing projection 165 of interconnecting lever 160. The other end of lever 173 has an engaging portion or hook 177 formed therein located to engage the pin 178 on detecting lever 39 and push pin 178, and thus detecting lever 39, in the counterclockwise direction (FIG. 1) about support shaft 27.

The control mechanism of the present invention also includes a lock prevention lever 181 shown in FIGS. 1A and 1B. Lock prevention lever 181 is arranged forwardly of interconnecting lever 160 in the recording and reproducing apparatus and it is rotatably supported by a pin 182 on mechanical deck 1. One end 181' of (FIG. 1A) lock prevention lever 181 is positioned to contact a lateral projection 183 formed on the lock lever 124 (See also FIG. 7). The opposite end of lever 181 (FIG. 1B) has a right-angled cut-out portion 184 formed therein which is engaged with a downwardly projecting tab 186 on one edge of a reproducing slide 185 secured to reproducing push button 5. By this arrangement, unless reproducing slide 185 is moved forward (or inwardly) with reproducing push button 5, lock prevention lever 181 does not rotate and its end 181 is not separated from the lateral projection 183 of lock lever 124. In that condition, lock lever 124 dannot lock change-over slide 110. Thus, when reproducing a push button 5 is not depressed, the tape recorder cannot be changed over into the automatic rewind mode and the automatic repeat mode even if actuating lever 131 is operated.

Finally, a change-over switch 187 for the recording-reproducing circuit of the apparatus is shown in the upper portion of FIG. 1B, which switch is associated with record push button 7. The latter was an extension 7' which contacts downwardly extending projection pin 189 on a generally triangular transmission member 188 which is rotatably supported by a pin 190 on mechanical deck 1 and connected to a recording slide 192 through a pivot pin 190. An oblong hole 193 is formed in recording slide 192 and receives a pin 194 on mechanical deck 1 to guide recording slide 192 in the leftward and rightward directions of sliding movement.

A downwardly projecting tab 195 is formed in one edge of the recording slide 192 to engage the end 197 of a second transmission member or lever 196 which is rotatably supported by a pin 198 on deck 1. A semicircular projection 199 (See also FIG. 15B) is formed on one edge of one arm transmission member 196 in position to contact the end 200' of a switch change-over slide 200. The latter has a pair of oblong holes 201, formed therein which receive a pair of bent tabs 203, formed in a second auxiliary base plate 202, to slidably guide switch change-over slide 200. A coil spring 204 is operatively engaged between switch change-over slide 200 and the arm of second transmission member 196 including projection 199. And, a U-shaped leaf spring 205 is mounted on change-over slide 200 and receives between its legs an actuating knob 206 of change-over switch 187.

Coil spring 204 serves to return both the switch change-over slide 200 and the recording slide to their original positions shown in FIG. 1B. When recording slide 192 is moved by more than the stroke required for operation of the switch change-over slide 200, the extra portion of the stroke is not transmitted to the switch change-over slide 200, but is absorbed by coil spring 204. Thus, the number of parts required for the change-over mechanism is small, and the strokes of the switch change-over slide 200 and the recording slide 192 can be freely selected. As a result a high degree of design freedom is permitted with tape recording and reproducing apparatus incorporating the present invention.

OPERATION

1. AUTOMATIC SHUT-OFF OPERATION

The tape recording and reproducing apparatus of the present invention is constructed to operate with a compact cassette, of the Philips type, using magnetic tape whose ends are fixed to a pair of reels which respectively are engaged with reel mounts 24 and 25 during operation of the apparatus. When the whole length of the magnetic tape in the cassette is wound on one of the cassette reels, the tape is tensioned and places a relatively large load on the reels 24 and 25 whose rotation then stops as a result of a torque limiter (not shown) in the drive mechanism for the reels.

In automatic shut-off operation according to this invention, the stoppage of the reels 24 and 25 is detected and the apparatus shut-off operation in any of the recording, the reproducing, fast forward or rewind modes of the apparatus. To set the apparatus for automatic shut-off, the control or actuating lever 131 is rotated in the counter-clockwise direction by using tab 131a to set the lever at the position shown in FIG. 7. In this position the pin 133 of actuating lever 131 is located at its outermost position so that change-over slide 110 is permitted to move to its outermost or original position under the influence of spring 116. As a result pin 104 of change-over lever 103 contacts the shoulder portion 119 of slide 110 (FIG. 1A) and operating slide 86, whose oblong hole 88 receives pin 91 of lever 103, is held against rotation in the clockwise direction about pin 90 against the bias of spring 94. Accordingly, pin 92 of operating slide 86 is held away from step 82 of cam opening 81 in rewind slide 75. In that condition, pin 92 cannot push or move rewind slide 75 from the position shown in FIG. 1A.

With slide 110 located at outermost position its pin 99 is located in the straight portion of bent hole 97 of shut-off slide 95 so that slide 95 cannot rotate about pin 98 and the inner end portion 101 of slide 95 is opposed to pin 93 of slide 86. In that position, the inner end portion 101 of slide 95 can be pushed inwardly by pin 93 of operating slide 86.

With the change-over control mechanism in this configuration, set for automatic shut-off, the apparatus is conditioned to automatically shut off when the magnetic tape in the cassette is fully wound on one of the cassette reels. When the apparatus is then operated in the reproducing or play mode, by depressing push button 5, the tape is wound on the reel engaged with mount 25 which is rotated in the counter clockwise direction, as seen in FIG. 9b. As reel mount 25 rotates, lever 43 is swung about support pin 48 against the bias of coil spring 49, by the cam portion 52 of cam gear 50 to move pin 44 in slot 42 of lever 39. At the same time, rotational movement is transmitted to lever 39 through pin 40 of intermediate lever 34 from reel mount 25 (see FIG. 6). Thus, in 44 of swinging lever 43 reciprocates between the right end of the cross shaped opening 42 and pocket 45 with the swing motion of the swinging lever 43.

When all of the magnetic tape is wound on the cassette reel engaged with reel mount 25, rotation of the reel mount 25 is stopped due to the tension in the tape. Accordingly, no rotational moment is transmitted to the detecting lever 39, and pin 44 simply reciprocates between the right end of opening 42 and pocket 47 with the continued swinging motion of lever 43. When the pin 44 enters pocket 47 a substantial amount of pivotal movement of lever 43 in the counter-clockwise direction is permitted and pin 57 of that lever pushes against the adjacent end of interconnecting lever 55 to rotate lever 55 in the counter-clockwise direction (FIG. 9B) about support pin 56.

When lever 55 rotates in this manner, the pin 58 on its other end engages stop lever 59 to rotate the stop lever 59 in a clockwise direction about support pin 60 against the bias of coil spring 61. As a result, the left end of stop lever 59 is disengaged from pin 68 of drive gear 62 (see FIG. 1B) to release the drive gear for rotation.

As previously described, cam 69 on drive gear 62 is engaged with arm 73 of shut-off lever 70. Since shut-off lever 70 is normally urged in the counterclockwise direction about support pin 71 by coil spring 72 (FIG. 1B), this counter-clockwise bias of the arm is applied to cam 69, and causes gear 62 to be rotated in the clockwise direction about its support shaft 63. As a result of the clockwise rotation of gear 62, pinion 66 which was opposed to the toothless portion 64 of the drive gear comes into meshing engagement with the teeth of drive gear 62.

Pinion 66 is secured to the capstan 67, together with the fly-wheel 51, to rotate therewith. When the power switch of the apparatus is on, capstan 67, and therefore pinion 66 rotates in the counter-clockwise direction in the conventional manner. Thus, once pinion 66 meshes with the teeth of drive gear 62 it rotates the drive gear in the clockwise direction. The arm 73 of shut-off lever 70 then follows cam 69, rotating with drive gear 62, and the shut-off lever 70 is rotated in the clockwise direction (FIG. 9B) about support pin 71, against the bias of coil spring 72.

When lever 70 rotates in the clockwise direction, the slant step 74 formed of its left end (FIG. 9A) pushes pin 93 of operating slide 86 to move the operating slide 86 rearwardly in deck 1. The pin 93 of operating slide 86 then pushes the end portion 101 of shut-off slide 95 to move rearwardly. This movement of slide 95 causes the actuating extension 102 of slide 95 to pull pin 22 of locking plate 14 rearwardly. Thus the locking plate is rotated in the counterclockwise direction (FIG. 2) about pins 15 against the bias of springs 16. Accordingly the previously depressed reproducing push button 5 is released from projection 19 (FIG. 5) of locking plate 14, and the reproducing push button 5 returns to its original position under the bias of spring 9, thereby placing the recording and reproducing apparatus into its stop mode. In a like manner, the automatic shut-off operation can be effected in each of the reproducing, recording, fast forward, and rewind modes which are selectively maintained by locking the respective push buttons with locking plate 14.

Figure 10:
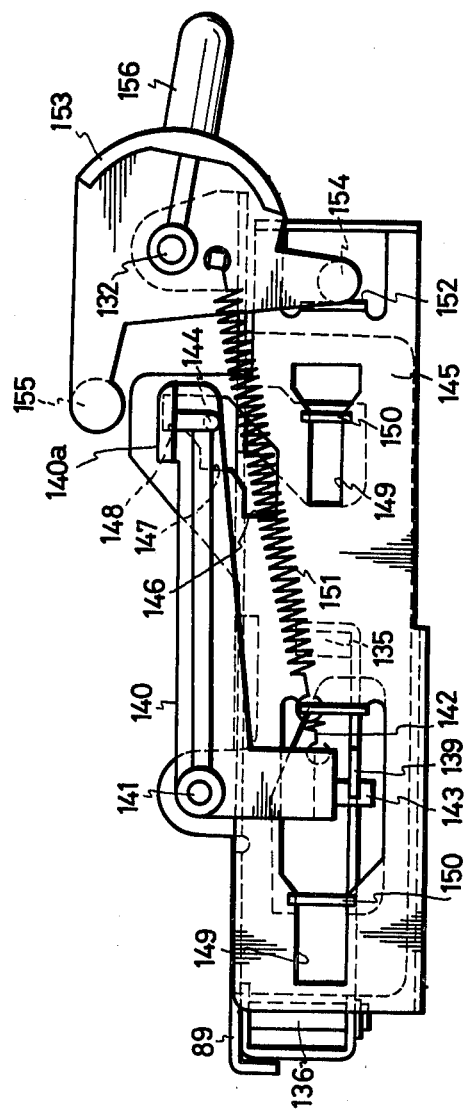
FIG. 10 is a side view taken along line X — X of FIG. 9A.

The automatic shut-off operation can also occur when the radio receiver in the apparatus is operated in the recording mode. As seen in FIGS. 1A and 9A, the pin 93 of operating slide 86 is also opposed to the arm 138 of radio release lever 135. Thus, when pin 93 is pushed rearwardly by shut-off lever 70, arm 138 of radio release lever 135 is also pushed by pin 93, so that radio release lever 135 is rotated in the counterclockwise direction (FIG. 9A) about pin 136 against the bias of coil spring 137. With this rotation of radio release lever 135, the pin projection 143 of lock lever 140 is pushed rearwardly by the slant projection 139 of radio release lever 135. As a result, lock lever 140 is rotated in the clockwise direction (FIG. 10) about pin 141, and pin 144 of lock lever 140 is disengaged from lock step 148 of slide 145. The lock slide is thereby freed to move to the right forwardly, under the influence of coil spring 151. This forward movement of slide 145 then causes pin 144 to engage lock step 147 and stop further movement of the slide. With the rightward movement of lock slide 145, the bent tab 152 of lock slide 145 pushes in 154 of the radio changeover lever 153 to rotate the radio change-over lever 153 in the counter-clockwise direction (FIG. 10) about support pin 132 causing the lever 153 to actuate a radio control switch (not shown) and shut-off the radio receiver.

2. AUTOMATIC REWIND OPERATION

In the automatic rewind operation according to this invention, when all of the magnetic tape is wound on the cassette reel engaged take-up reel mount 25 in the recording mode or the reproducing mode of the apparatus, the magnetic tape is automatically rewound on the cassette reel engaged with supply reel mount 24; after all of the magnetic tape is rewound on the cassette reel engaged with supply reel mount 24, the apparatus is automatically shut-off. Thus, at a later time, signals on the tape can be reproduced directly from the very beginning of the magnetic tape in the tape recorder. That is, of course, very convenient for the user.

Figure 11:
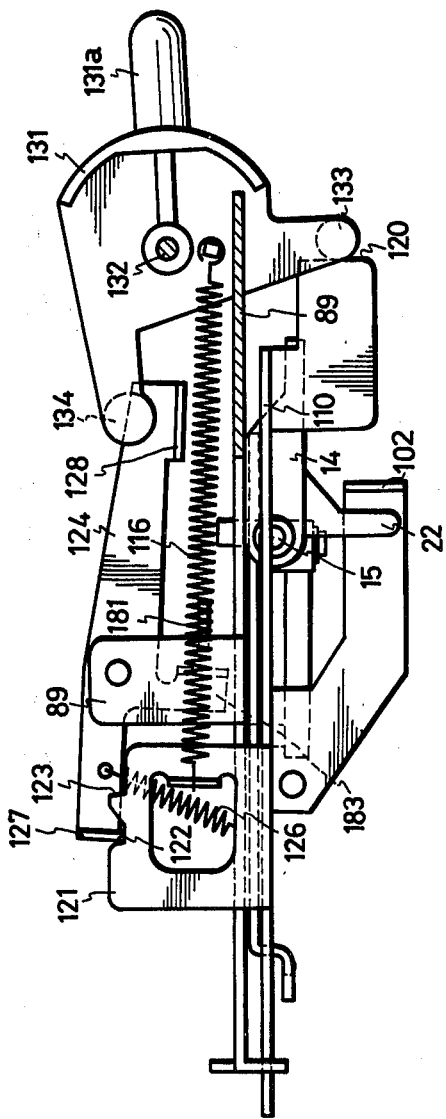
FIG. 11 is a side view taken along line XI — XI of FIG. 13A to be described below.

As shown on FIG. 11 in order to place the change-over mechanism in the automatic rewind-shut-off mode, lever 131 is rotated by one step by further depressing knob 131a. As a result change-over slide 110 moves to the left (inwardly) as pin 133 of lever 131 pushes the contact portion 120 of actuating lever 131 against the bias of coil spring 116. Thus the lock portion 127 of lock lever 124 engages the shoulder 122 of the bent tab portion 121 of change-over slide 110 to lock change-over slide 110 in the position shown in FIGS. 11, 12 and 13A.

With this rearward movement of change-over slide 110, its shoulder portion 119 is separated from pin 104 of change-over lever 103. Thus change-over lever 103 is released for rotation and operating slide 86, which is engaged with pin 91 of change-over lever 103, can rotate in the clockwise direction about pin 90 under the influence of spring 94. Upon rotation of slide 86 its pin 92 is moved into position opposite step 82 of the cam opening 81 in rewind slide 75.

When change-over slide 110 is moved rearwardly, as shown in FIG. 11, its pin 99 remains located within the confines of the straight portion of bent hole 97 and shutoff slide 95 does not rotate about pin 98.

Figure 13A:
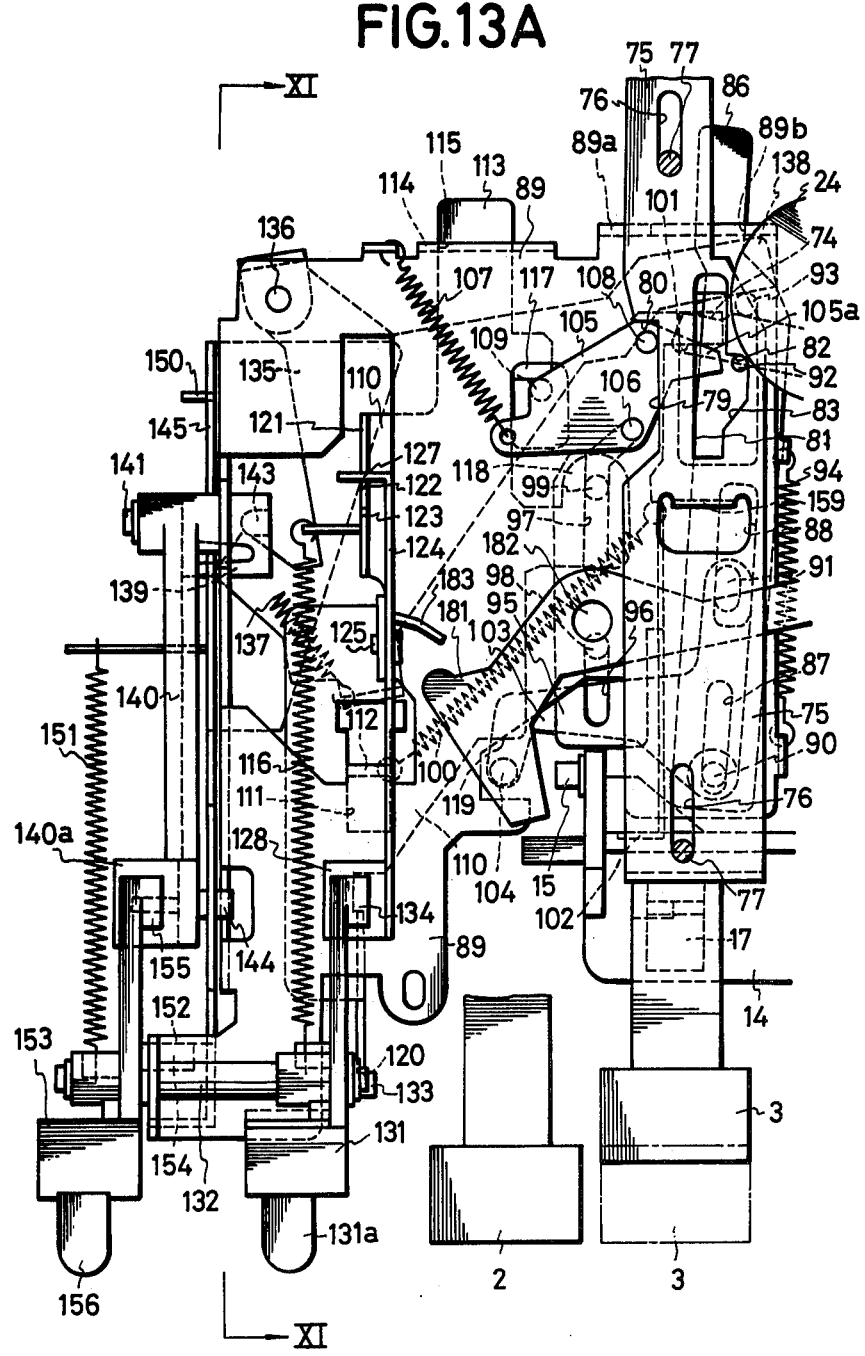
FIG. 13A and FIG. 13B, when assembled as shown in FIG. 27, is a plan view of the control mechanism of the present invention showing the relative positions of the elements thereof when the tape recorder is set for an automatic rewind operation and the tape end is detected in the recording mode.
Figure 13B:
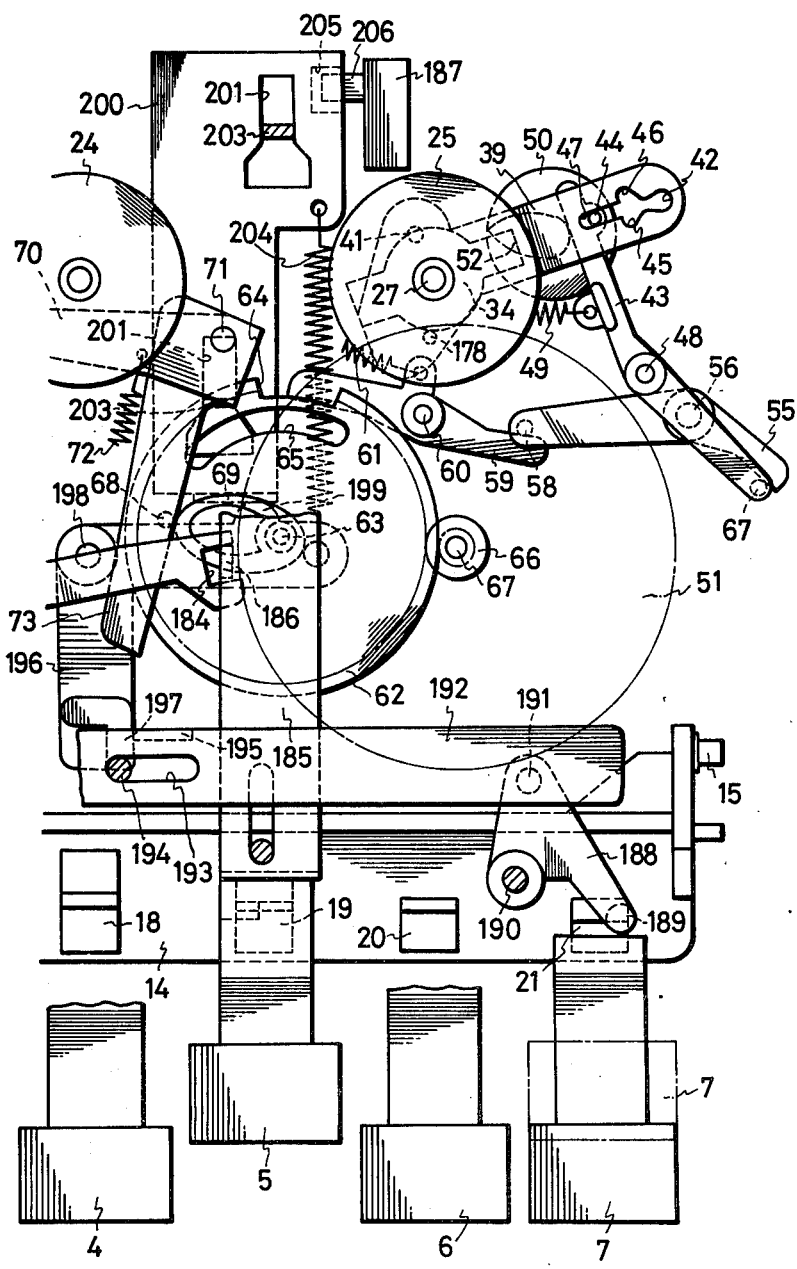

With the change-over control mechanism in this configuration, set for automatic rewind, the apparatus is conditioned to automatically rewind the tape when the magnetic tape in the cassette is fully wound on the cassette reel engaged with take-up reel 25. When this apparatus is operated in the record mode, by depressing push buttons 5 and 7, the tape is wound on the cassette reel engaged with mount 25 which is rotated in the counter-clockwise direction, as seen in FIG. 13B. As reel 25 rotates swinging lever 43 is swung about support pin 48 by cam 52 on gear 50, against the bias of coil spring 49, to move pin 44 in slot 42 of detecting lever 39. At the same time rotational movement is transmitted to lever 39 through pin 40 of intermediate lever 34 from reel mount 25 (see FIG. 6). Thus pin 44 of swinging lever 43 reciprocates between the right end of the cross shaped opening 42 and pocket 45.

When all of the magnetic tape is wound on the cassette reel engaged with reel mount 25, rotation of the reel mount 25 is stopped due to the tension in the tape. Accordingly no rotational moment is transmitted to detecting lever 39 and pin 44 simply reciprocates between the right end of opening 42 and pocket 47. When pin 44 enters pocket 47, pivotal movement of lever 43 in the counter-clockwise direction is permitted and pin 57 of that lever 43 pushes against the adjacent end of interconnecting lever 55 to rotate lever 55 in the counter-clockwise direction (FIG. 13B) about support pin 56. When lever 55 rotates in this manner, pin 58 on its other end engages stop lever 59 to rotate lever in the clockwise direction about support pin 60 against the bias of coil sprng 61. As a result, the left end of stop lever 59 is disengaged from pin 68 of drive gear 62 to release the drive gear for rotation.

As previously described, cam 69 on drive gear 62 is engaged with arm 73 of lever 70. Since shut-off lever 70 is normally urged in the counter-clockwise direction about support shaft 71 by coil spring 72, (FIG. 13B) this counter-clockwise bias of the arm is supplied to cam 69 and causes drive gear 62 to be rotated in the clockwise direction about its support shaft 63. As a result of the clockwise rotation of gear 62, pinion 66, which was opposed to the toothless portion 64 of drive gear 62, comes into meshing engagement with the teeth of drive gear 62. As previously described, pinion 66 is secured to capstan 67, together with the fly-wheel 51, and as long as the power switch is turned on, capstan 67 and therefore pinion 66 rotates in the counter-clockwise direction. Thus, once pinion 66 meshes with the teeth of drive gear 62 it rotates the drive gear in the clockwise direction. The arm 73 of shut-off lever 70 then follows cam 69, rotating with drive gear 62, and shut-off lever 70 is rotated in the clockwise direction (FIG. 13B) about support pin 71 against the bias of coil spring 72.

When lever 70 rotates in the clockwise direction, the step 74 formed on its left end (FIG. 13A) pushes pin 93 of operating slide 86 to move operating slide 86 rearwardly in deck 1. As already described, operating slide 86 was previously rotated in the clockwise direction (FIG. 13A) by coil spring 94, so that pin 92 of operating slide 86 is opposed to step 82 of the cam opening 81 in rewind slide 75. Accordingly, when operating slide 86, moves rearwardly rewind slide 75 is pushed by pin 92 of operating slide 86 into its rearward position shown in FIG. 13A.

With this movement of rewind slide 75, lock lever 105, whose pin 108 normally contacts the edge of rewind slide 75 is rotated in the clockwise direction about support pin 106 by coil spring 107 so that pin 108 moves into engagement with the step 80 of rewind slide 75. Thus, rewind slide 75 is locked against the pull of coil spring 78 (see FIG. 1A). As the result, slide 75 pulls rewind push button 3 to its inner position to operate an associated switch (not shown) and place the recorder in the rewind mode so that the magnetic tape is rewound onto the cassette reel engaged with the supply reel mount 24.

When rewind slide 75 and rewind push button 3 moved to their depressed position in this manner, the lock projection 11 of rewind push button 3 gets over projection 17 of locking plate 14 (see FIG. 2 and FIG. 5) and thus rotates locking plate 14 through a small angele. With this rotation of locking plate 14, recording push button 7, which had been locked by projection 21 of locking plate 14, is released since projection 21 is lower than projection 17 associated with rewind push button 3. However, this rotation of locking plate 14 does not release reproducing push button 5, which is locked by projection 19 on locking plate 14, since projection 19 is higher than projection 17.

With the lock-release of recording push button 7, recording slide 192 is returned to its original position. Thus switch change-over slide 200, connected through second transmission member 196 to recording slide 192, is moved to actuate switch 187 to put the recording-reproducing circuit into its reproducing mode from its recording mode.

As in the previously described shut-off operation, the radio switch can be turned off with rearward movement of operating slide 86 when the control mechanism is set for automatic rewind. Referring to FIG. 13A, the relatively long arm 138 of radio release lever 135 is still positioned adjacent the pin 93 of operating slide 86 even though the slide has been rotated in the clockwise direction by the coil spring 94. Thus, when pin 93 of operating slide 86 is pushed rearwardly by shut-off lever 70, arm 138 of radio release lever 135 is also pushed rearwardly by pin 93 to rotate lever 135 in the counter-clockwise direction about pin 136 against the bias of coil spring 137. As a result, slant projection 139 of radio release lever 135 pushes projection 143 of lock lever 140 to rotate the lock lever 140 in the clockwise direction (FIG. 10) about pin 141. When lever 140 moves in this manner, pin 144 of lock lever 140 is released from lock step 148 of lock slide 145, so that slide 145 can move to the right (FIG. 10) under the influence of coil spring 151 with the result that pin 144 of lock lever 140 engages lock step 147 of slide 145. The rightward movement of lock slide 145 also causes the bent tab 152 of lock slide 145 to push pin 154 of radio change-over lever 153 to rotate the radio change-over lever in the counter-clockwise direction about support pin 132, to operate a radio control switch (not shown) and shut off the radio receiver.

Figure 14:
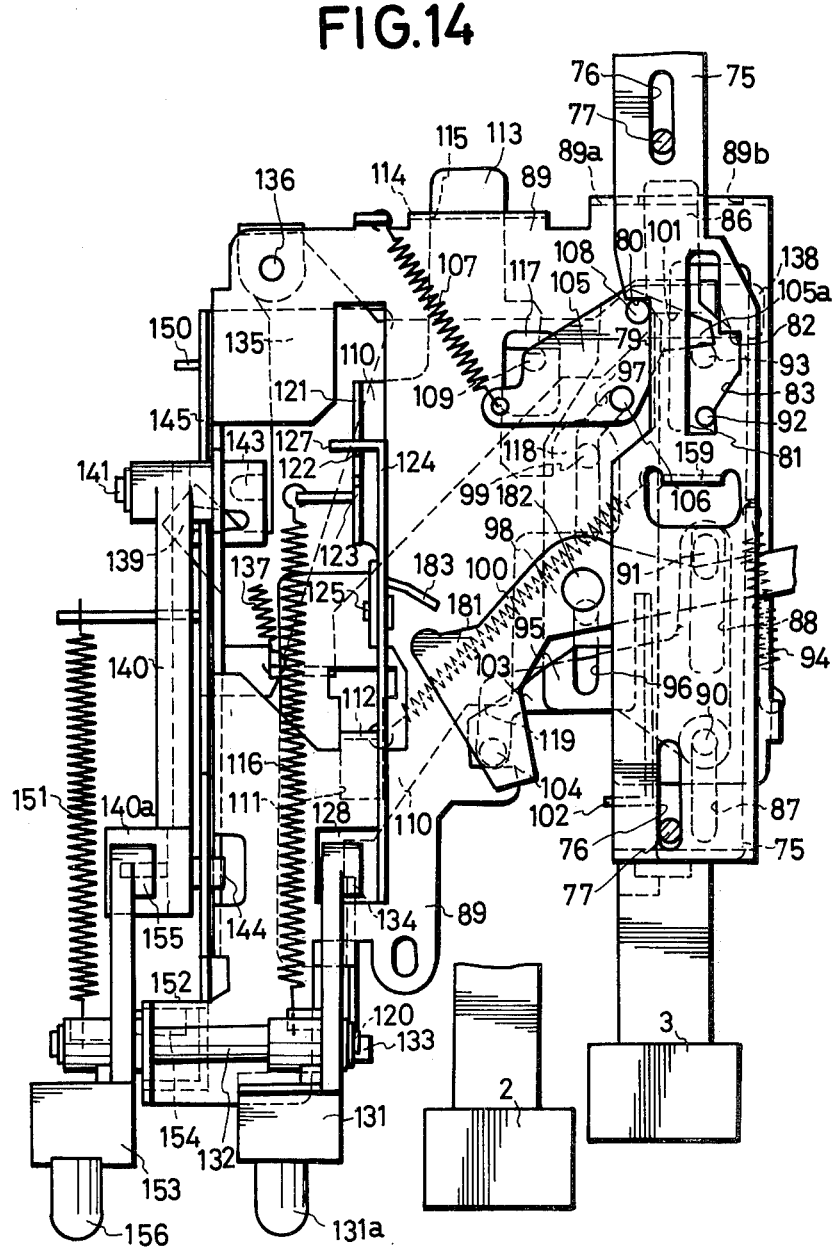
FIG. 14 is a plan view of a part of the control mechanism of the present invention, in which an operating slide is shown as being moved back to its original position from the position shown in FIG. 13A.

FIG. 13B shows drive gear 62 after a rotation of about 270° from its initial position wherein the tape end was first detected. After a further rotation of about 90 degrees, pin 68 of drive gear 62 again contacts the left end of stop lever 59 and rotation of drive gear 62 stops. When gear 62 reaches that position, shut-off lever 70 has been rotated back to its original position, in the counter-clockwise direction, about pin 71 by coil spring 72. Thus operating slide 86, which had been pushed through the pin 93 by shut-off lever 70, slides back to its original position under the influence of of tension spring 94, as shown in FIG. 14. As slide 86 returns to its original position, pin 92 of the slide is guided along the slant portion 83 of cam opening 81 in rewind slide 75 which, as described above is locked by the pin 108 of lock lever 105. Thus operating slide 86 rotates in the counter-clockwise direction (FIG. 14) about the pin 90 against the bias of coil spring 94 so that operating slide 86 is relocated in its original position and pin 92 of the slide 86 is no longer opposed to step portion 82 of the cam opening 81 in rewind slide 75.

As above described, when rewind slide 75 is locked at its forward position by lock lever 105, the automatic rewind operation is effected. During the automatic rewind operation, swinging lever 43 is swung about support pin 48 by cam 52 on gear 50 against the bias of coil spring 49, to move pin 44 in slot 42 of detecting lever 39. In the automatic rewind mode, the reel mount 25 is rotated in the clockwise direction (FIG. 15B) about support shaft 27 and thus a clockwise rotational movement is transmited to lever 39 through pin 40 of intermediate lever 34 from the reel mount 25 (see FIG. 16). Pin 44 of swinging lever 43 thus reciprocates between the right end of cross-shaped opening 42 and pocket 46.

When all of the magnetic tape is rewound on the cassette engaged with reel mount 24 rotation of reel mount 25 is stopped due to the tension in the tape. Accordingly no rotational movement is transmitted to detecting lever 39 and pin 44 simply reciprocates between the right end of opening 42 and pocket 47.

When pin 44 enters pocket 47, a substantial amount of pivotal movement of lever 43 in the counterclockwise direction is permitted and pin 57 of that lever 43 pushes against the adjacent end of interconnecting lever 55 to rotate lever 55 in the counter-clockwise direction (FIG. 15B) about support pin 56. When lever 55 rotates in this manner, pin 58 on its other end engages stop lever 59 to rotate lever 59 in the clockwise direction about support pin 60 against the bias of coil spring 61. As a result, the left end of stop lever 59 is disengaged from pin 68 of drive gear 62 to release the drive gear for rotation.

As previously described, cam 69 on drive gear 62 is engaged with arm 73 of shut-off lever 70. Since that lever is normally urged in the counter-clockwise direction about support shaft 71 by coil spring 72 (FIG. 15B), this counter-clockwise bias of the arm is applied to cam 69 and causes drive gear 62 to be rotated in the clockwise direction about support shaft 63. As a result of the clockwise rotation of gear 62, pinion 66 is secured to capstan 67, together with the fly-wheel 51, and as long as the power switch is turned on, capstan 67 and therefore pinion 66 rotates in the counter-clockwise direction. Thus, once pinion 66 meshes with the teeth of drive gear 62, it rotates the drive gear in the clockwise direction. The arm 73 of shut-off lever 70 then follows cam 69, rotating with drive gear 62, and shut-off lever 70 is rotated in the clockwise direction (FIG. 15B) about support pin 71 against the bias of coil spring 72.

Figure 15A:
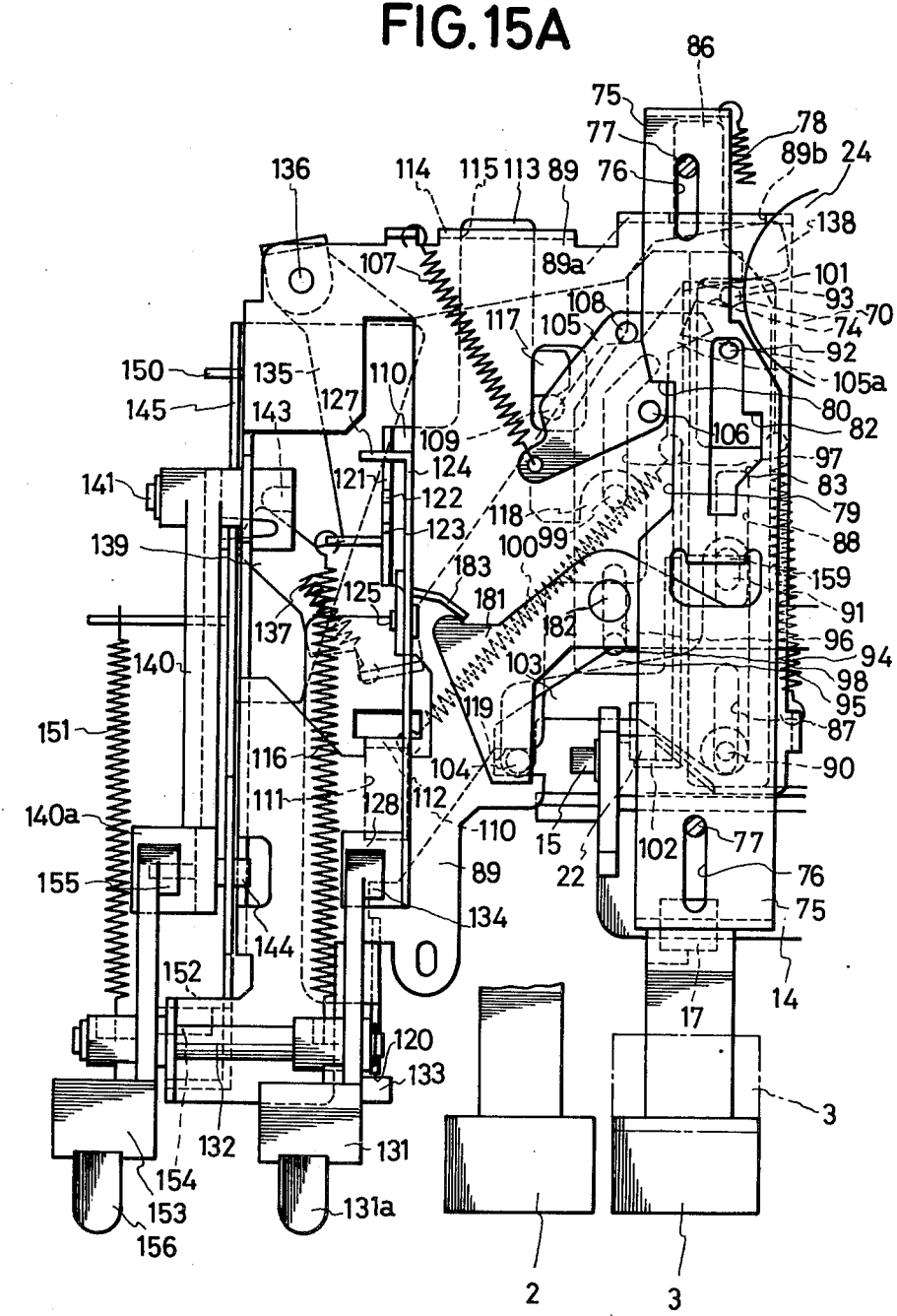
FIG. 15A and FIG. 15B, when assembled as shown in FIG. 28, is a plan view of the control mechanism of the present invention showing the relative position of the elements thereof when the tape recorder is set for an automatic rewind and shut-off operation.
Figure 15B:
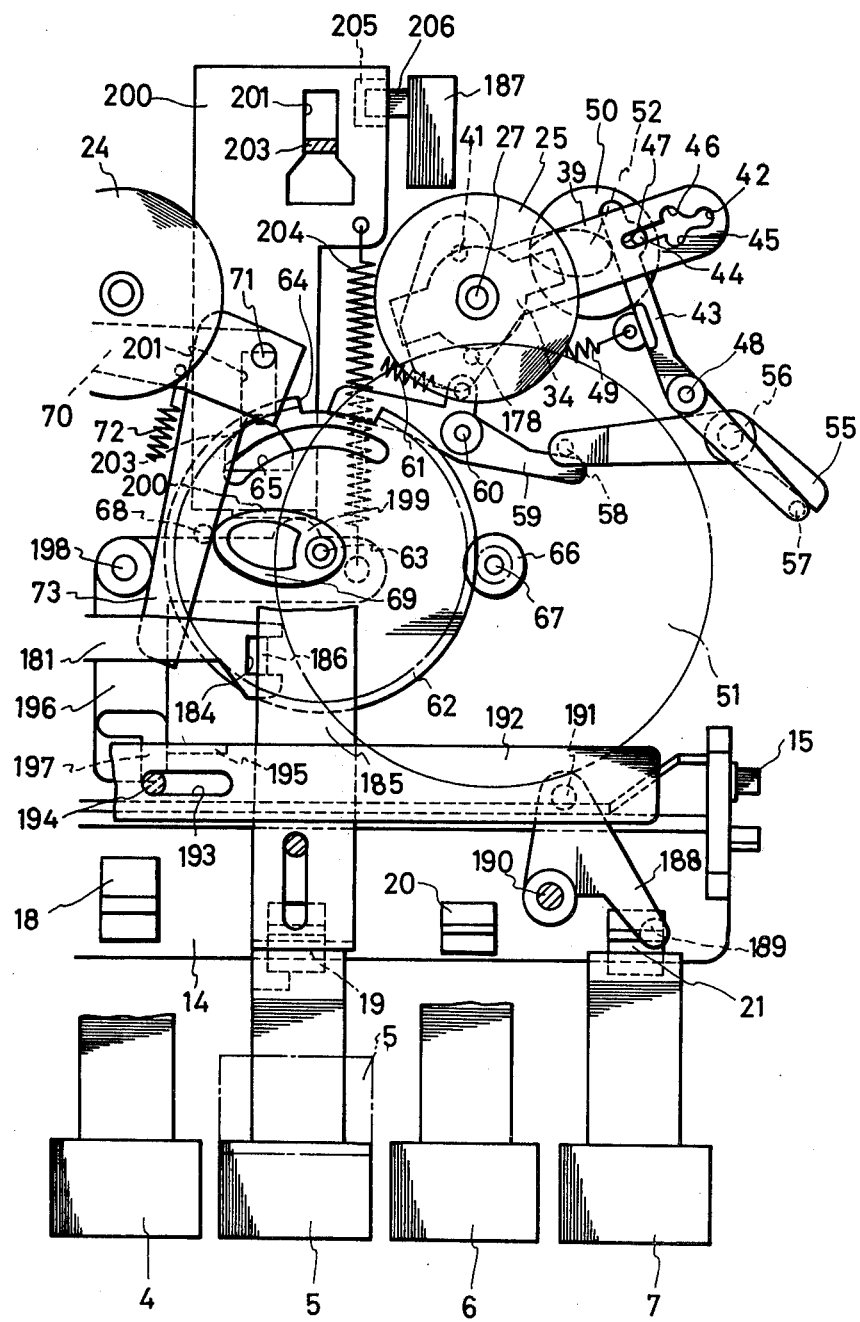

When lever 70 rotates in the clockwise direction, the stop 74 formed on its left end (FIG. 14) pushes pin 93 of operating slide 86 to move operating slide 86 rearwardly in deck 1. With this movement of operating slide 86, its pin 92 pushes against arm portion 105a of lock lever 105 to rotate lock lever 105 in the counter-clockwise direction about support pin 106 against the bias of coil spring 107. Pin 108 of lock lever 105 is thus released from step 80 of rewind slide 75 so that slide 75 is released to move back to its original position under the influence of the coil spring 78, as shown in FIG. 15A. Thus, rewind push button 3 returns to its normal position and the rewind operation is completed.

When operating slide 86 is moved rearwardly by shutoff lever 70 at the end of the rewind operation, pin 92 passes step 82 and slant portion 83 in cam opening 81 of rewind slide 75. And, since operating slide 86 is moved rearwardly with its pin 93 engaged with the slant step 74 of shut-off lever 70, clockwise rotation of operating slide 86 under the influence of tension spring 94 is prevented. Accordingly, pin 92 of operating slide 86 does not enter into the cut-out portion between step 80 and slant portion 83.

When pin 93 of operating slide 86 is pushed by shut-off lever 70, the end portion 101 of shutoff slide 95 is also pushed by pin 93 to move shutoff slide 95 rearwardly against the bias of coil spring 100. Thus, the actuating extension 102 of shut-off slide 95 pulls pin 22 of locking plate 14 rearwardly to pivot the locking plate in the counterclockwise direction (FIG. 2) about pins 15 against the b as of torsion springs 16. Thus reproducing push button 5, which had been locked by projection 19 (FIG. 5) of locking plate 14, returns to its original position and the tape recorder is changed over into the stop mode.

As above-described, the automatic rewind operation starts with the detection of the stoppage of reel mount 25 when all of the magnetic tape is wound on the cassette reel engaged with take-up reel mount 25; and the shut-off operation is effected to change the tape recorder into the stop mode, when all of the magnetic tape is rewound on the cassette reel mounted on supply reel mount 24. That is very convenient when it is desired that signals on the tape be sequently reproduced from the magnetic tape.

3. AUTOMATIC REPEAT OPERATION

In the automatic repeat operation, rewind and reproducing modes are automatically repeated, after all of the magnetic tape is wound on the cassette reel mounted on the take-up reel mount 25 in the recording mode or the reproducing mode of the apparatus.

Figure 16:
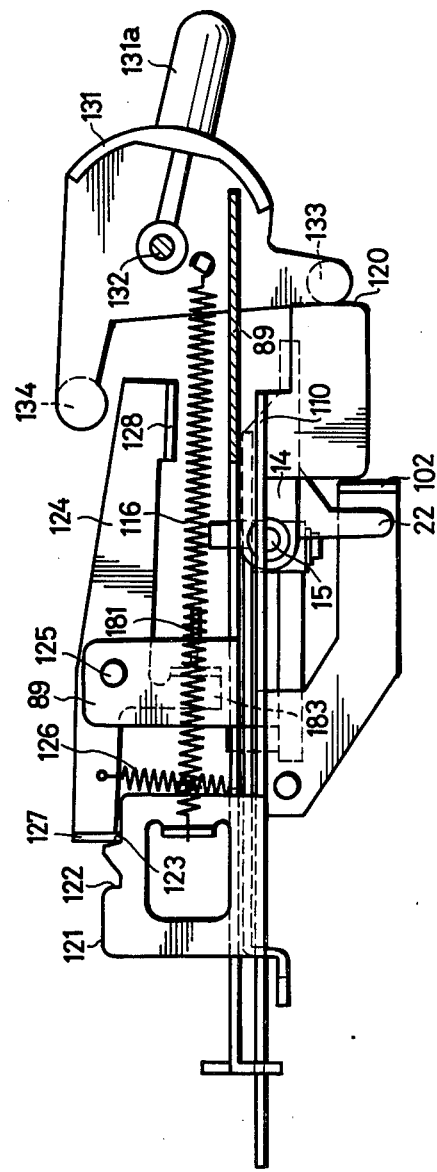
FIG. 16 is a side view taken along the line XVI — XVI of FIG. 18A to be described below.

For the automatic repeat operation, actuating lever 131 is rotated by two steps by depressing knob 131a to the position shown in FIG. 16. This movement of lever 131 causes pin 133 to push change-over slide 110 inwardly, to the left in FIG. 16. As a result, the shoulder 123 of change-over slide 110 is engaged with the lock tab 127 of lock lever 124, thereby to lock the change-over slide 110 and hold it against the bias of spring 116. The inward or rearward movement of slide 110 causes its shoulder portion 119 to separate from pin 104 of change-over level 103 so that change-over lever 103 is freed to rotate. Accordingly, operating slide 86, which is engaged with pin 91 of change-over lever 103 rotates slightly in the clockwise direction about pin 90 under the influence of coil spring 94 so that pin 92 of operating slide 86 moves to a position opposite step portion 82 of cam opening 81 in rewind slide 75.

The inward movement of change-over slide 110 also causes its pin 99 to move into the slant portion of slot 97 in shut-off slide 95, so shut-off slide 95 rotates through a predetermined angle in the counter-clockwise direction about pin 98. The engaging end 101 of shut-off slide 95 is thus moved away from pin 93 of operating slide 86 so that the previously described shut-off operation is not effected when operating slide 86 is moved rearwardly.

Figure 18A:
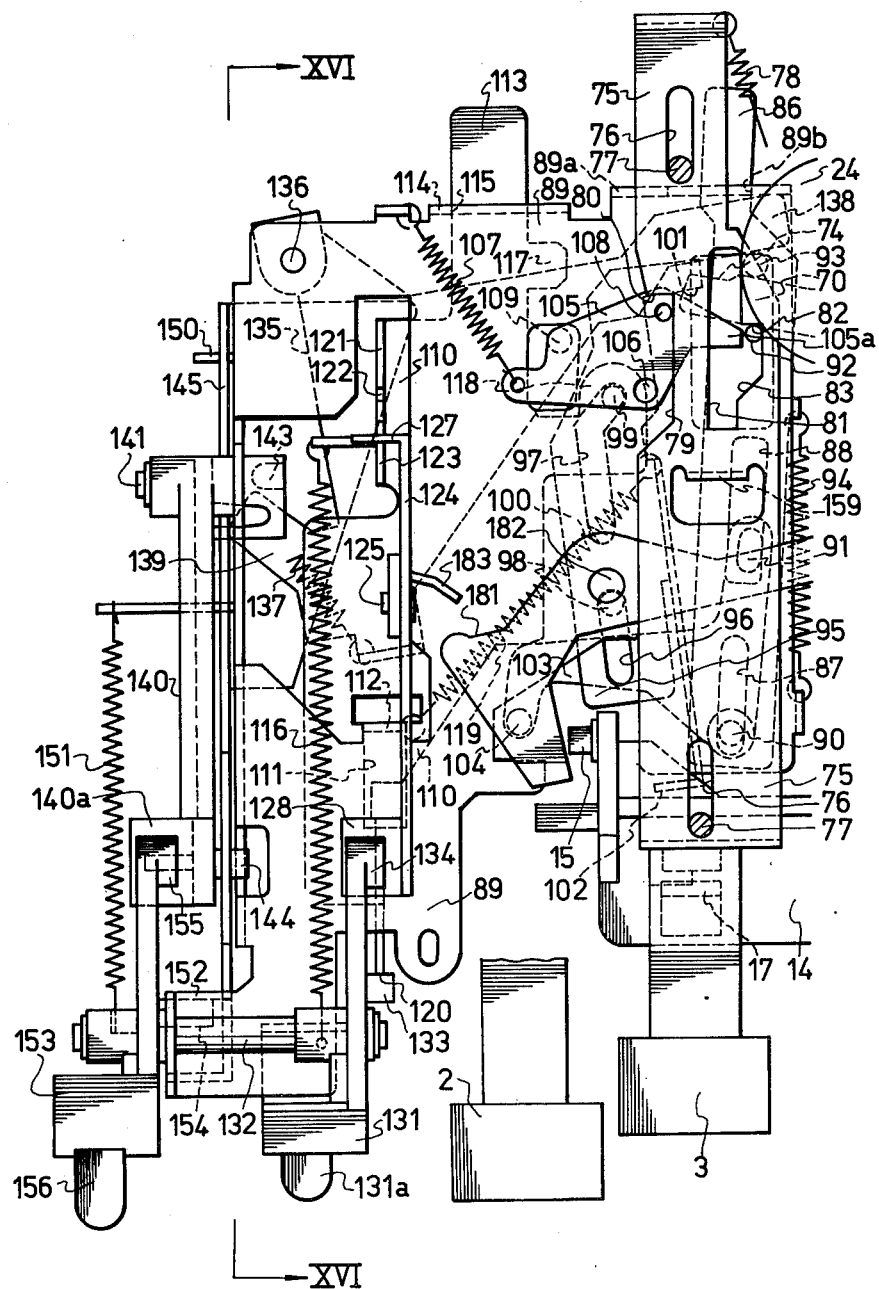
FIG. 18A and FIG. 18B, when assembled as shown in FIG. 29, is a plan view of the control mechanism of the present invention, showing the relative positions of the elements thereof when the tape recorder is set for the automatic repeat operation and the tape end is detected in the recording mode.
Figure 18B:
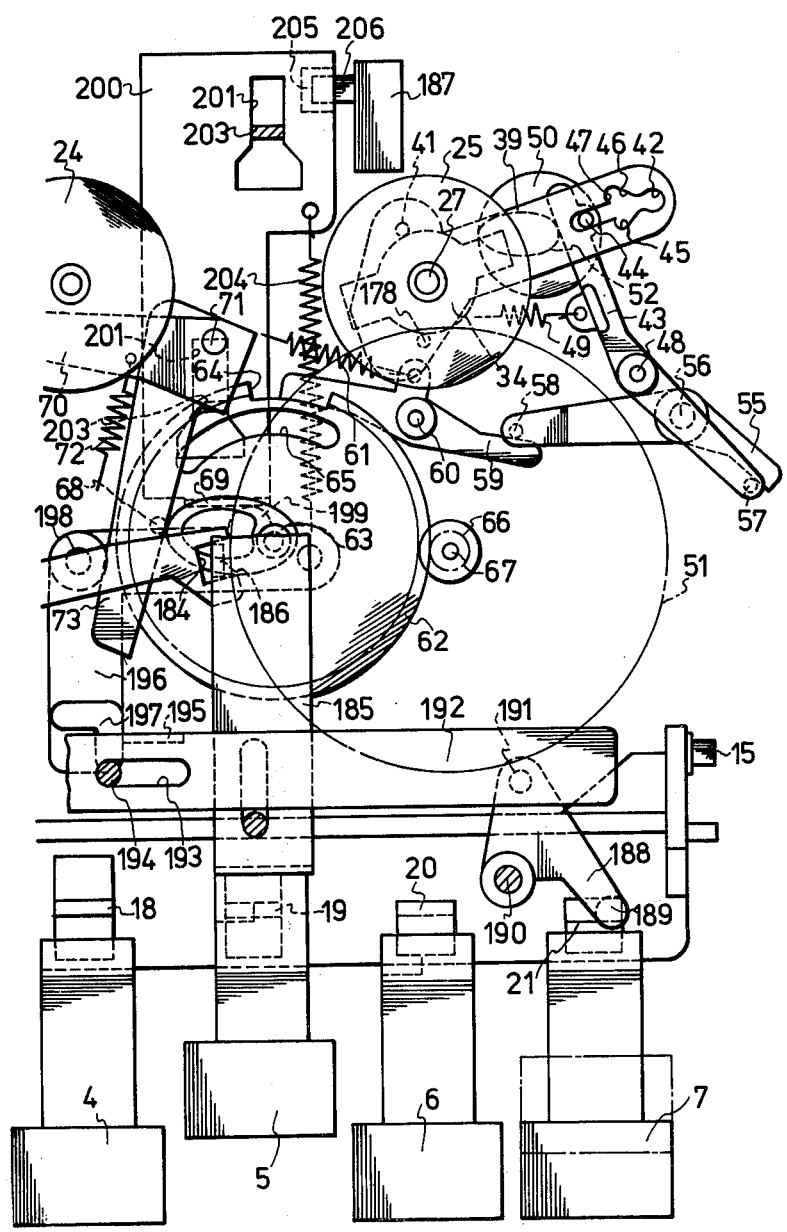

When the changeover control mechanism is in this configuration, set for automatic repeat, the apparatus is conditioned to automatically repeat signals on the tape when the magnetic tape in the cassette is fully wound on the cassette reel engaged with take-up reel mount 25 at the end of a record or reproducing operation. When the apparatus is operated in the reproducing mode (by depressing push button 5) or in the record mode (by depressing push buttons 5 and 7) the tape is wound on the cassette reel engaged with reel mount 25, which is rotated in the counterclockwise direction (FIG. 18b). As reel mount 25 rotates, lever 43 is swung about support pin 48 by cam 52 on gear 50 against the bias of coil spring 49, to move pin 44 in slot 42 of detecting lever 39. At the same time a counterclockwise rotational moment is transmitted to detecting lever 39 through pin 40 of intermediate lever 34 from reel mount 25 (see FIG. 6). Thus pin 44 of swinging lever 43 reciprocates between the right end of cross-shaped opening 42 and pocket 45.

When all of the magnetic tape is wound on the cassette reel engaged with reel mount 25, rotation of reel mount 25 is stopped due to tension in the tape. Accordingly, no rotational moment is transmitted to detecting lever 39 and pin 44 simply reciprocates between the right end of opening 42 and pocket 47. When pin 44 enters pocket 47 a substantial amount of pivotal movement of lever 43 in the counter-clockwise direction is permitted and pin 57 of that lever pushes against the adjacent end of interconnecting lever 55 to rotate lever 55 in the counter-clockwise direction about support pin 56. When lever 55 rotates in this manner, pin 58 on its other end engages stop lever 59 to rotate lever 59 in the clockwise direction about support pin 60 against the bias of coil spring 61. As a result the left end of stop lever 59 is disengaged from pin 68 of drive gear 62 to release the drive gear for rotation.

As previously described, cam 69 on drive gear 62 is engaged with arm 73 of lever 70. Since shut-off lever 70 is normally urged in the counter-clockwise direction about support shaft 71 by coil spring 72, this counter-clockwise bias of the arm is applied to cam 69 and causes drive gear 62 to rotate in the clockwise direction about its support shaft 63. As a result of the clockwise rotation of gear 62, pinion 66, which was opposed to the toothless portion 64 of drive gear 62, comes into meshing engagement with the teeth of drive gear 62. As previously described, pinion 66 is secured to capstan 67, together with fly-wheel 51, and as long as the power switch is turned on, capstan 67, and therefore pinion 66, rotates in the counter-clockwise direction. Thus, once pinion 66 meshes with the teeth of drive gear 62, it rotates the drive gear in the clockwise direction. The arm 73 of shut-off lever 70 then follows cam 69, rotating with drive gear 62, and shut-off lever 70 is rotated in the clockwise direction (FIG. 18b) about support pin 71 against the bias of coil spring 72.

Figure 17:
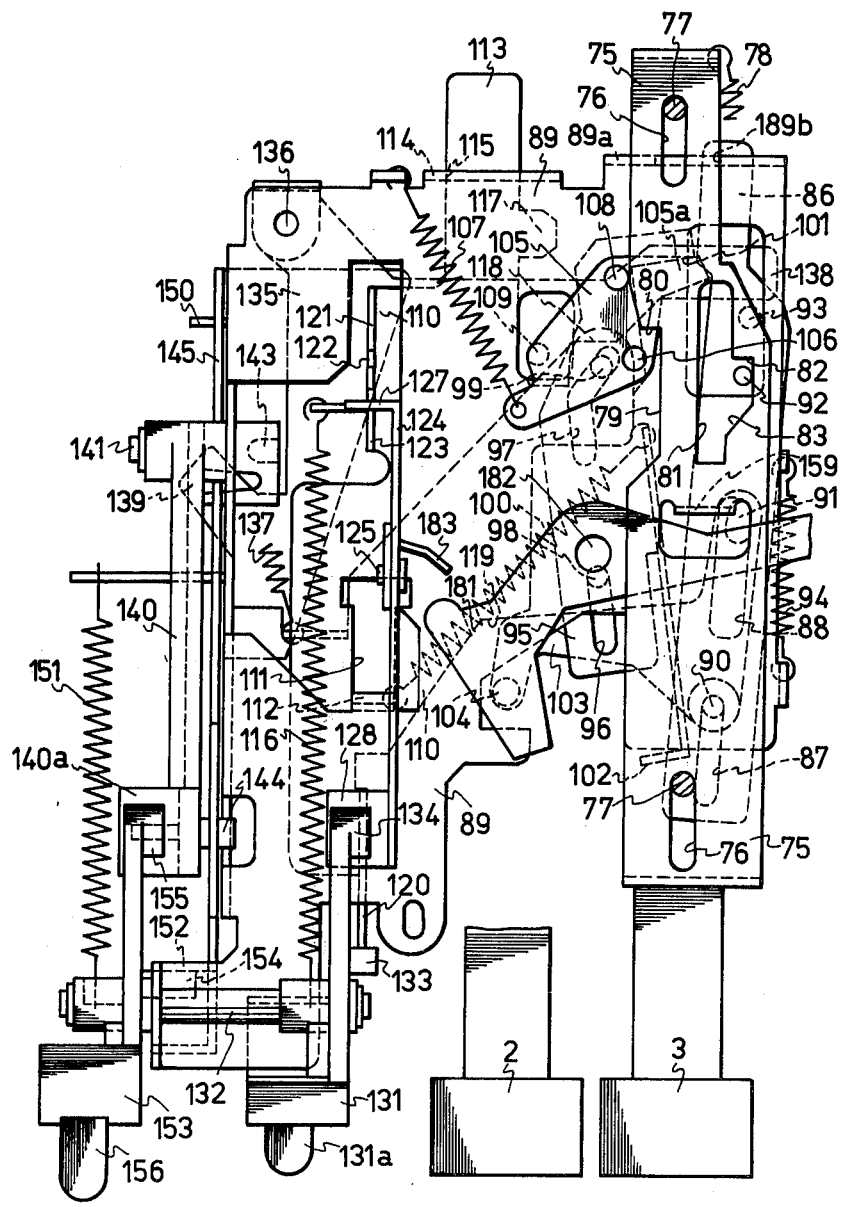
FIG. 17 is a plan view of a part of the control mechanism of the tape recorder, in which the changeover slide is moved forward by two steps.

When lever 70 rotates in the clockwise direction, the step 74 formed on its left end (FIG. 18A) pushes pin 93 of operating slide 86 to move operating slide 86 rearwardly in deck 1. As already described, operating table 86 was previously rotated in the clockwise direction (FIG. 17 and 18A) by coil spring 94, so that pin 92 of operating slide 86 is opposed to step 82 of cam opening 81 in rewind slide 75. Accordingly, when operating slide 86 moves rearwardly, rewind slide 75 is pushed by pin 92 of operating slide 86 into its rearward position shown in FIG. 18A.

With this movement of rewind slide 75, lock lever 105, whose pin 108 normally contacts the edge of rewind slide 75, is rotated in the clockwise direction about support pin 106 by coil spring 107, so that pin 108 moves into engagement with step 80 of rewind slide 75. Thus, rewind slide 75 is locked against the pull of coil spring 78 (See FIG. 1A). As a result, slide 75 pulls rewind push button 3 to its inner position to operate an associated switch (not shown) and place the recorder in the rewind mode so that the tape is rewound onto the cassette real engaged with supply reel mount 24.

When rewind slide 75 and rewind push button 3 move to their depressed position in this manner, lock projection 11 of rewind push button 3 gets over projection 17 of locking plate 14 (See FIG. 2 and FIG. 5) and thus rotates locking plate 14 through a small angle. With this rotation of locking plate 14, record push button 7, which had been locked by projection 21 of locking plate 14, is released since projection 21 is lower than projection 17 associated with rewind push button 3. However, this rotation of locking plate 14 does not release reproducing push button 5, which is locked by projection 19 on locking plate 14, since projection 19 is higher than projection 17.

With the lock-release of record push button 7, recording slide 192 is returned to its original position. Thus switch change-over slide 200, connected through second transmission member 196 to recording slide 192, is moved to actuate switch 187 to put the recording-reproducing circuit into its reproducing mode from its recording mode.

As in the previously described shut-off operation, the radio switch (not shown) can be turned off with the rearward movement of the operating slide 86 when the control mechanism is set for automatic repeat. Referring to FIG. 18A, the relatively long arm 138 of radio release lever 135 is positioned adjacent the pin 93 of operating slide 86 even though the slide had been rotated in the clockwise direction by coil spring 94. Thus when pin 93 of operating slide 86 is pushed rearwardly by shut-off lever 70, arm 138 of radio release lever 135 is also pushed rearwardly by pin 93 to rotate lever 135 in the counter-clockwise direction about pin 136 against the bias of coil spring 137. As a result, slant projection 139 of radio release lever 135 pushes projection 143 of lock lever 140 to rotate the lock lever in the clockwise direction (FIG. 10) about pin 141. When lever 140 moves in this manner, pin 144 of lock lever 140 is released from lock step 148 of lock slide 145, so that slide 145 can move to the right (FIG. 10) under the influence of coil spring 151, with the result that pin 144 of lock lever 140 engages lock step 147 of lock slide 145. The rightward movement of lock slide 145 also causes the bent tab 152 of lock slide 145 to push pin 154 of radio change-over lever 153 to rotate the radio change-over lever in the counter-clockwise direction about support pin 132, to operate radio control switch (not shown) and shut off the radio receiver.

Figure 19:
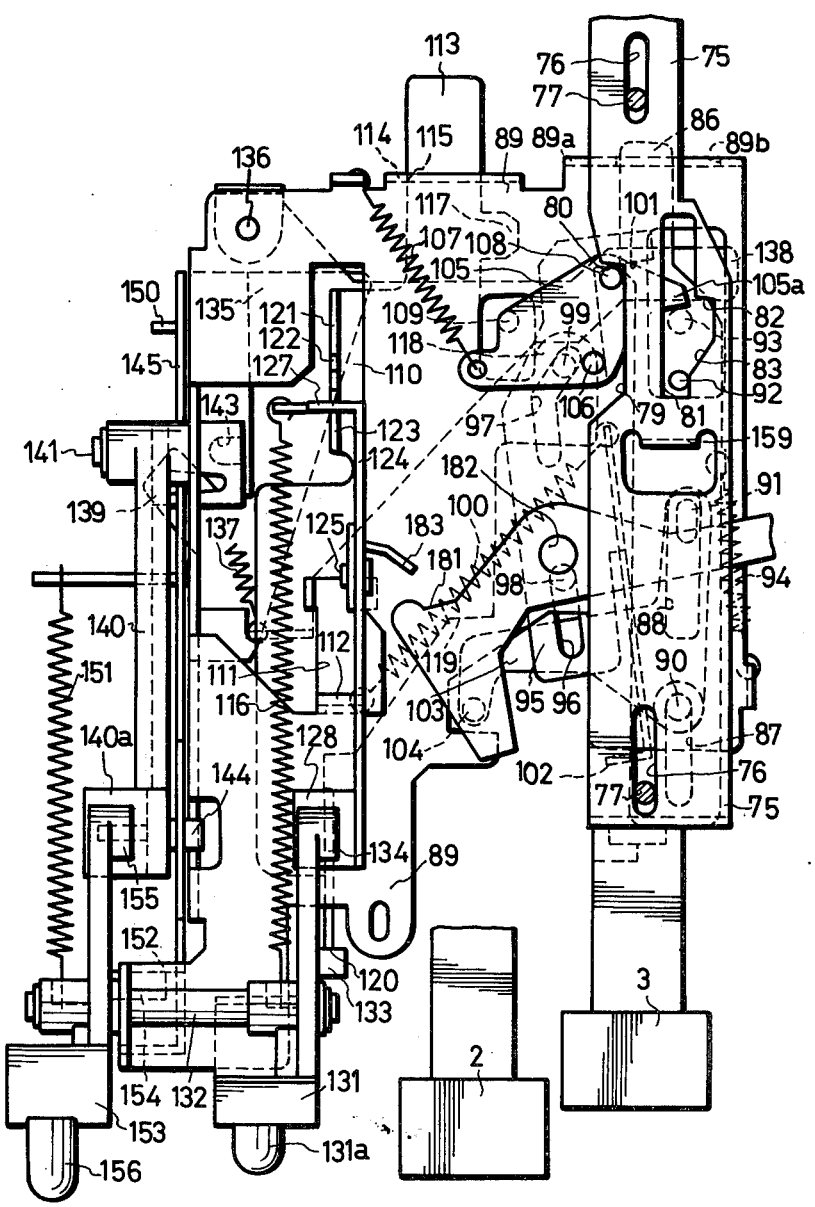
FIG. 19 is a plan view of a part of the control mechanism of the tape recorder, in which the operating slide is moved back to its original position from the position whown in FIG. 18A.

FIG. 18B shows drive gear 62 after rotation of about 270° from its initial position wherein this tape end was first detected. After a further rotation of about 90 degrees, pin 68 of drive gear 62 again contacts the left end of stop lever 59 and rotation of drive gear 62 stops. When gear 62 reaches that position, shut-off lever 70 has been rotated back to its original position, in the counter-clockwise direction, about pin 71 by coil spring 72. Thus operating slide 86, which had been pushed through pin 93 by the shut-off lever 70, slides back to its original position under the influence of tension spring 94, as shown in FIG. 19. As slide 86 returns to its original position, pin 92 of slide 86 is guided along the slant portion 83 of cam opening 81 in rewind slide 75 which, as described above, is locked by the pin 108 of lock lever 105. Thus, operating slide 86 rotates in the counter-clockwise direction (FIG. 19) about pin 90 against the bias of coil spring 94 as that operating slide 86 is relocated in its original position and pin 92 of operating slide 86 is no longer opposed to step portion 82 of cam opening 81 in rewind slide 75.

As above described, when rewind slide 75 is locked at its forward position by lock lever 105, the rewind operation is effected. During the rewind operation, swinging lever 43 is swung about support pin 48 by cam 52 on gear 50 against the bias of coil spring 49, to move pin 44 in slot 42 of detecting lever 39. In the rewind mode, the reel mount 25 is rotated in the clock-wise direction (FIG. 20B) about support shaft 27 and thus a clockwise rotational moment is transmitted to lever 39 through pin 40 of intermediate lever 34 from reel mount 25 (see FIG. 6). Pin 44 of swinging lever 43 thus reciprocates between the right end of cross-shaped opening 42 and pocket 46.

When all of the magnetic tape is rewound on the cassette reel engaged with supply reel mount 24, rotation of take-up reel mount 25 is stopped due to the tension in the magnetic tape. According, no rotational moment is transmitted to detecting lever 39 and pin 44 simply reciprocates between the right end of opening 42 and pocket 47.

When pin 44 enters pocket 47 a substantial amount of pivotal movement of lever 43 in the counter-clockwise direction is permitted and pin 57 of that lever 43 pushes against the adjacent end of the interconnecting lever 55 to rotate lever 55 in the counter-clockwise direction (FIG. 20B) about support pin 56. When lever 55 rotates in this manner, pin 58 on its other end engages stop lever 59 to rotate lever 59 in the clockwise direction about support pin 60 against the bias of coil spring 61. As a result, the left end of stop lever 59 is disengaged from pin 68 of drive gear 62 to release the drive gear for rotation.

Figure 20A:
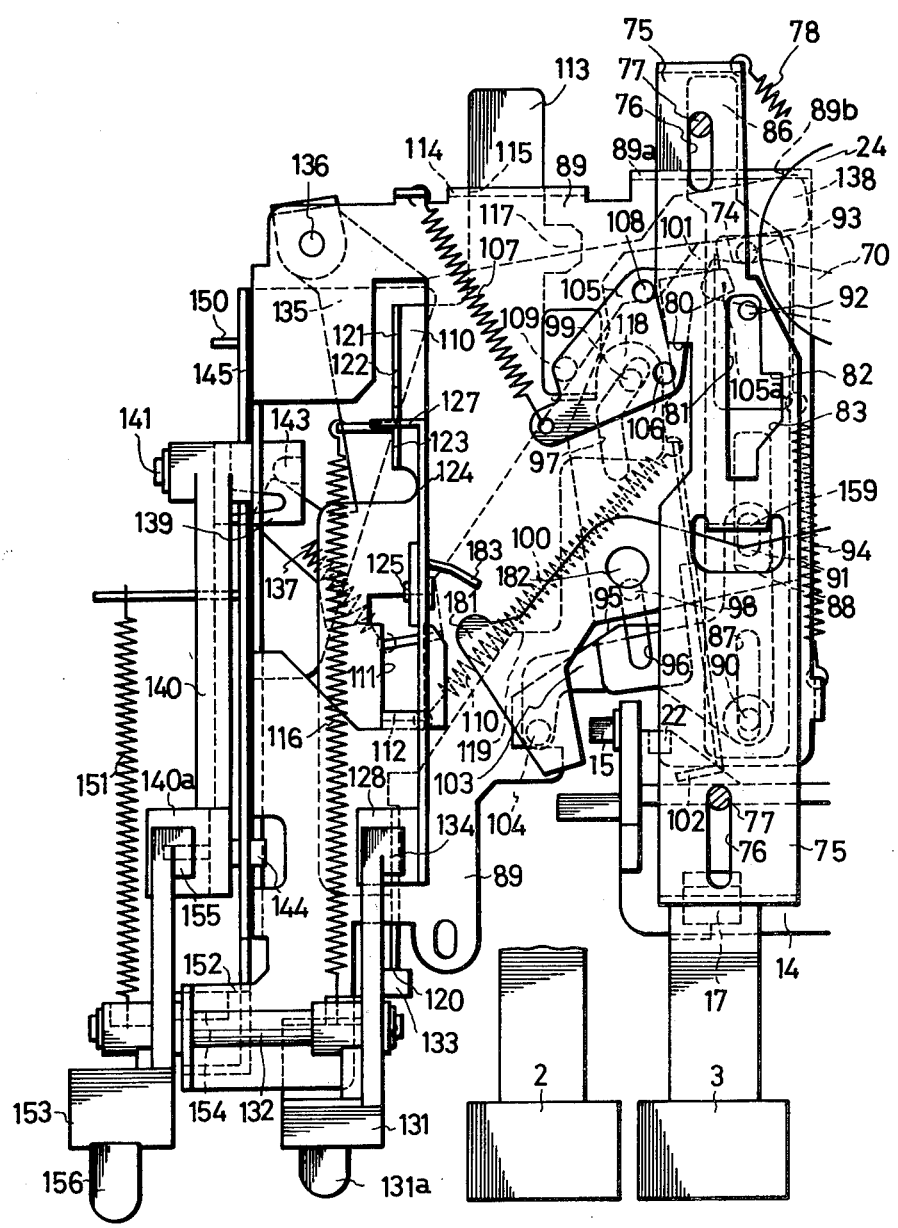
FIG. 20A and FIG. 20B, when assembled as shown in FIG. 30, is a plan view of the control mechanism of the present invention, showing the relative positions of the elements thereof when the tape recorder is set for the automatic repeat operation, and the tape end of the rewound magnetic tape is detected.
Figure 20B:
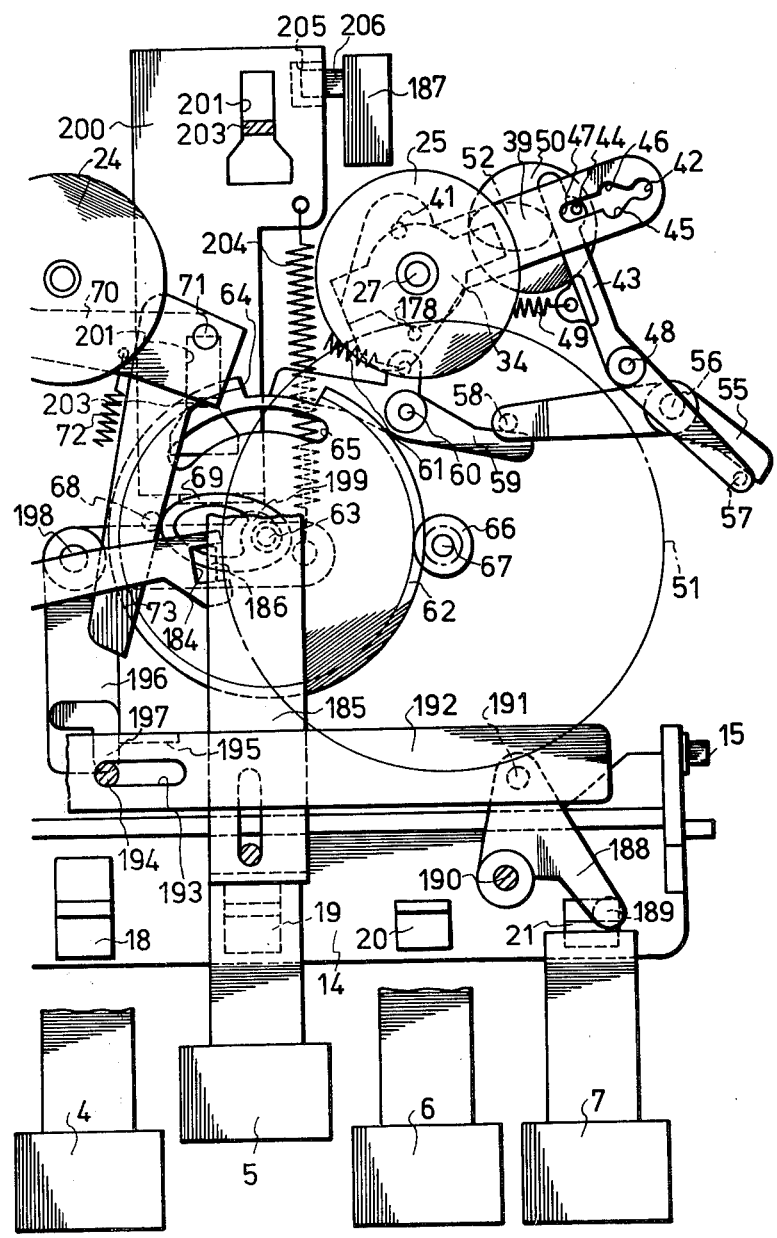

As previously described, cam 69 on drive gear 62 is engaged with arm 73 of the shut-off lever 70. Since that lever is normally urged in the counter-clockwise direction about the support shaft 71 by coil spring 72 (FIG. 20B), this counter-clockwise bias of the arm is applied to cam 69 and causes drive gear 62 to be rotated in the clockwise direction about support shaft 63. As a result of the clockwise rotation of gear 62, pinion 66, which was opposed to the toothless portion 64 of drive gear 62, comes into meshing engagement with the teeth of drive gear 62. Pinion 66 is secured to capstan 67, together with the fly-wheel 51 and as long as the power switch is turned on, capstan 67, and therefore the pinion 66, rotates in the counter-clockwise direction. Thus, once pinion 66 meshes with the teeth of drive gear 62, it rotates the drive gear in the clockwise direction. The arm 73 of shut-off lever 70 then follows cam 69, rotating with drive gear 62, and shut-off lever 70 is rotated in the clockwise direction round (FIG. 20B) about support 71 against the bias of coil spring 72. When lever 70 rotates in the counter-clockwise direction, step 74 formed on its left end (FIG. 19A) pushes pin 93 of operating slide 86 to move operating slide 86 rearwardly in deck 1. With this rearward movement of operating slide 86, its pin 92 pushes against arm portion 105a of lock lever 105 to rotate lock lever 105 in the counter-clockwise direction about support pin 106 against the bias of coil spring 107. Pin 108 of lock lever 105 is thus released from step 80 of rewind slide 75 so that slide 75 is released to move to its original position, under the influence of coil spring 78, as shown in FIG. 20A. Thus, the rewind push button 3 returns to its normal position and the rewind operation is completed.

When operating slide 86 is moved rearwardly by shut-off lever 70, at the end of the rewind operation, pin 92 passes step 82 and slant portion 83 in cam opening 81 of rewind slide 75. And, since operating slide 86 is moved rearwardly with its pin 93 engaged with the slant step 74 of shut-off lever 70, clockwise rotation of operating slide 86 under the influence of tension spring 94 is prevented. Accordingly, pin 92 of operating slide 86 does not enter into the cut-out portion between step portion 80 and slant portion 83.

When operating slide 86 is moved by shut-off lever 70, shut-off slide 95 is not pushed by pin 93, since the shut-off slide was previously rotated in the counter-clockwise direction about pin 98 by pin 99 of the change-over slide 110, as shown on FIG. 20A. Accordingly, the shut-off operation is not effected upon detection of the stop of the take-up reel at the end of the rewind stage of the automatic repeat mode of the apparatus.

Figure 21:
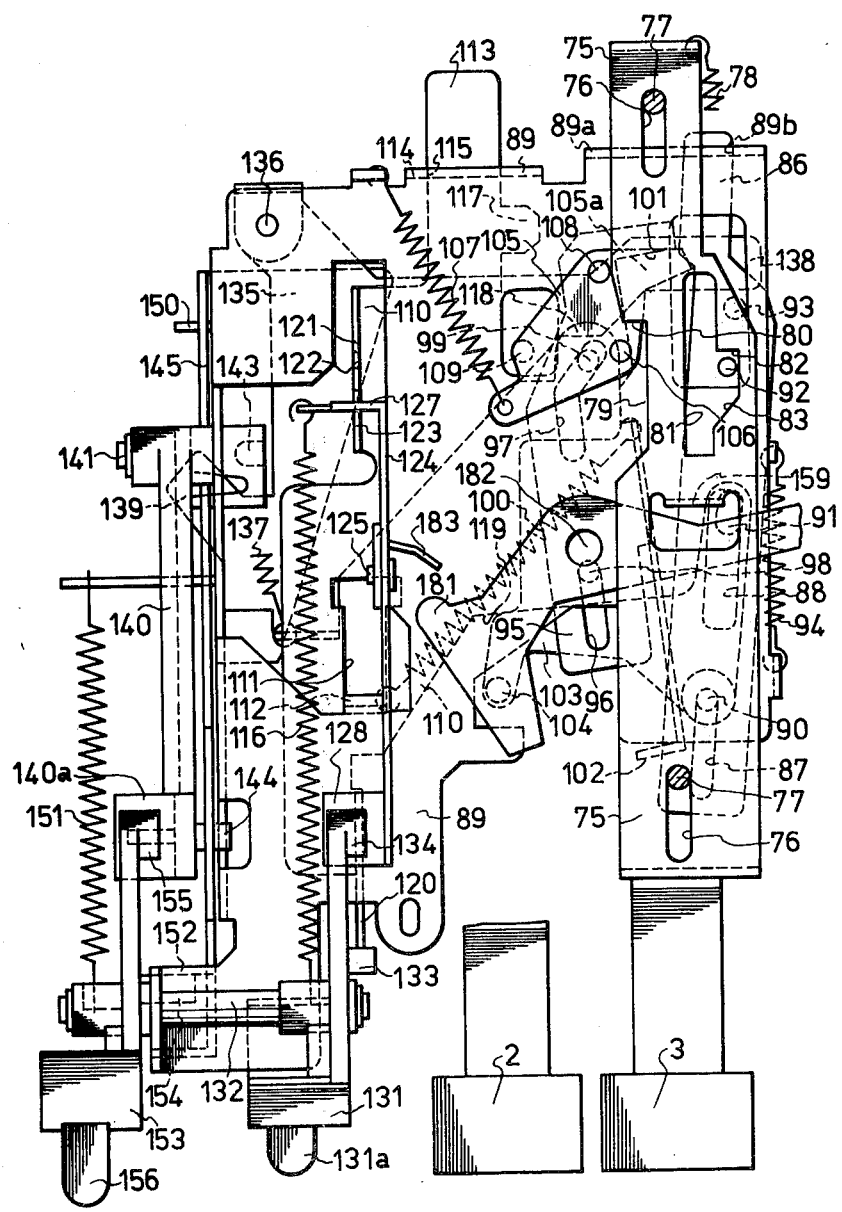
FIG. 21 is a plan view of a part of the control mechanism of the tape recorder, in which the operating slide is moved back to its original position from the position shown in FIG. 20A.

With rewind slide 75 released and shut-off lever 70 rotated back to its original position, operating slide 86 is moved back to its original position under the influence of the coil spring 94 as described above. Since slant step 74 of shut-off lever 70 is then disengaged from pin 93 of operating slide 86, the restriction to the clockwise rotation of operating slide 86 is released and the operating slide 86 rotates in the clockwise direction about pin 90 under the influence of the coil sping 94, as shown on FIG. 21, so that pin 92 of operating slide 86 is opposed to step portion 82 of cam opening 81 in rewind slide 75. In that condition, the tape recorder can be changed over into the rewind mode when operating slide 86 is again moved forward by shut-off lever 70.

In the rewind mode, reproducing push button 5 remains locked by locking plate 14 so that when rewind slide 75 is released from locking, the tape recorder is changed to the reproducing mode. The magnetic tape is then transported from the supply reel to the takeup reel, and signals are reproduced from the magnetic tape.

In the reproducing mode, swinging lever 43 is swung about support pin 48 by cam 52 of cam gear 50 against the bias of coil spring 49 to move pin 44 in slot 42 of detecting lever 39. At the same time, a counter-clockwise rotational moment is transmitted to detecting lever 39 through pin 40 of intermediate lever 34 from reel mount 25 (see FIG. 6). Thus, pin 44 of swinging lever 43 reciprocates between the right end of opening 42 and pocket 45.

When all of the magnetic tape is wound on the cassette reel engaged with reel mount 25, rotation of reel mount 25 is stopped due to tension in the magnetic tape. Accordingly, no rotational moment is transmitted to detecting lever 39 and pin 44 simply reciprocates between the right end of opening 42 and pocket 47. When pin 44 enters pocket 47 a substantial amount of pivotal movement of lever 43 in the counter-clockwise direction is permitted and pin 57 of that lever pushes against the adjacent end of interconnecting lever 55 to rotate lever 55 in the counter-clockwise direction about support pin 56. When lever 55 rotates in this manner, pin 58 on its other end engages stop lever 59 to rotate lever 59 in the clockwise position direction about support pin 60 against the bias of coil spring 61. As a result, the left end of stop lever 59 is disengaged from pin 68 of drive gear 62 to release the drive gear for rotation.

Figure 22A:
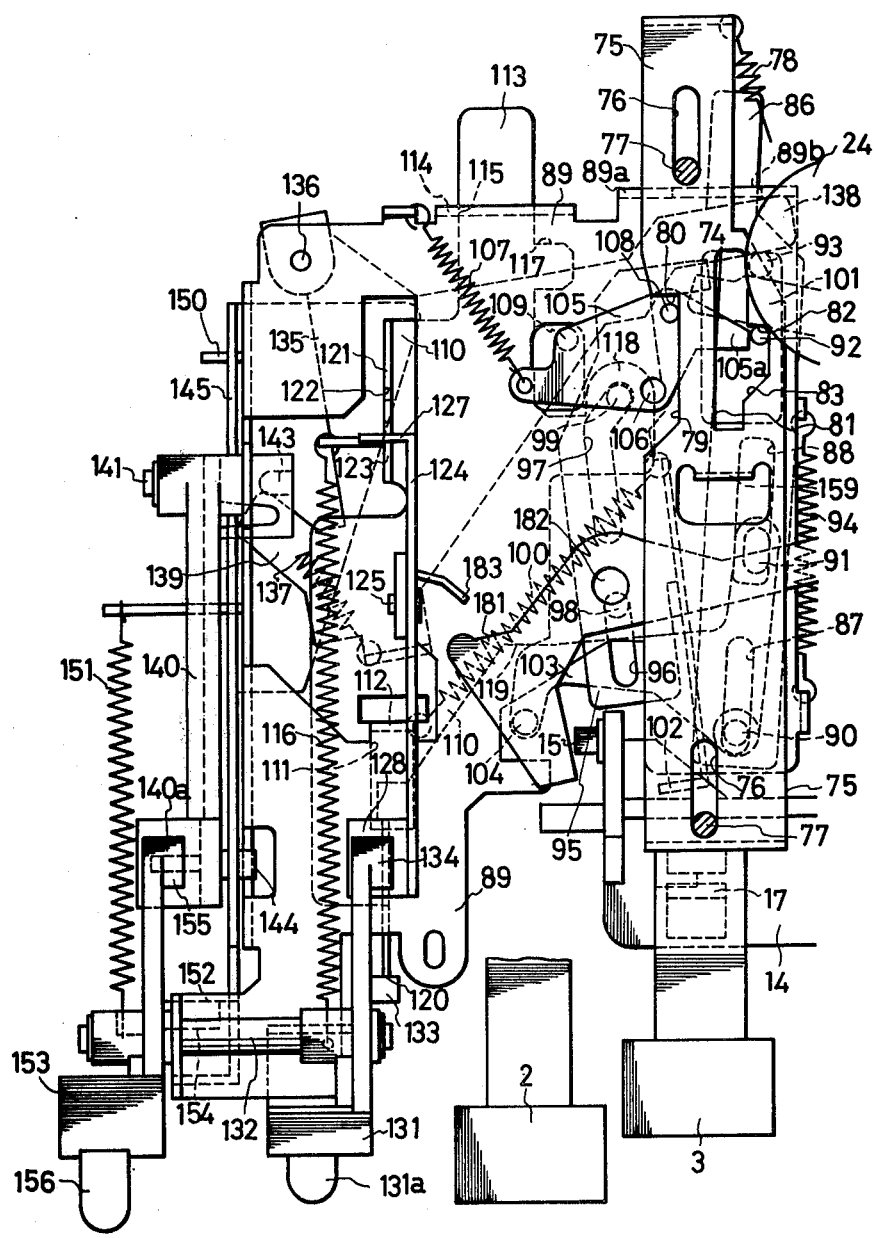
FIG. 22A and FIG. 22B, when assembled as shown in FIG. 31 is a plan view of the control mechanism of the present invention, showing the relative position of the elements thereof when an automatic repeat operation, and the tape end of the magnetic tape is detected in the reproducing mode.
Figure 22B:
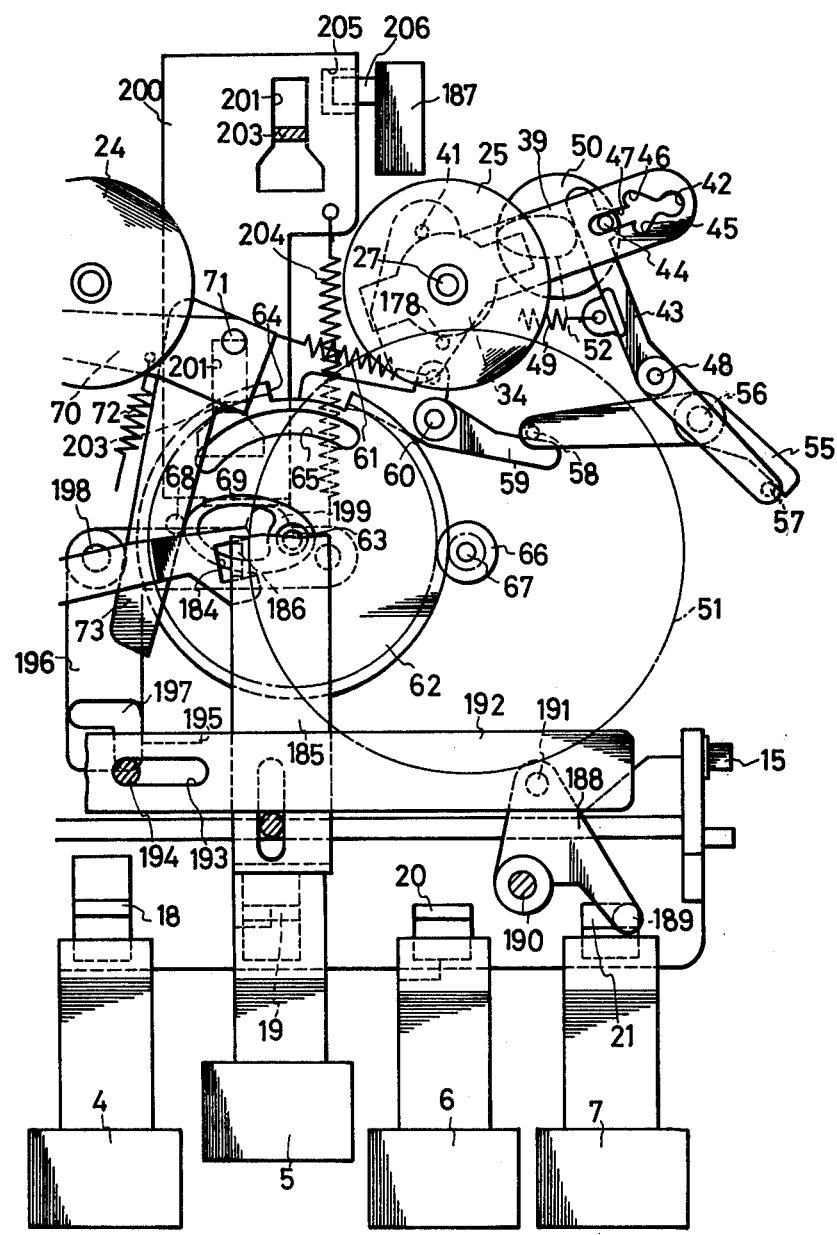

As previously described cam 69 on drive gear 62 is engaged with arm 73 of lever 70. Since shut-off lever 70 is normally urged in the counter-clockwise direction about support shaft 71 by coil spring 72, this counter-clockwise bias of the arm is applied to cam 69 and causes drive gear 62 to rotate in the clockwise direction about support shaft 63. As a result of the clockwise rotation of gear 62, pinion 66, which was opposed to the toothless portion 64 of drive gear 62, comes into meshing engagement with the teeth of drive gear 62. As previously described, pinion 66 is secured to capstan 67, together with fly-wheel 51, and as long as the power switch is turned on, capstan 67, and therefore pinion 66, rotates in the counter-clockwise direction. Thus, once pinion 66 meshes with the teeth of drive gear 62, it rotates the drive gear in the clockwise direction. The arm 73 of shut-off lever 70 then follows cam 69 rotating with drive gear 62, and shutoff lever 70 is rotated in the clockwise (FIG. 22B) direction about support pin 71 against the bias of coil spring 72.

When lever 70 rotates in the clockwise direction, the step 74 formed on its left end (FIG. 22A) pushes pin 93 of operating slide 86 to move operating slide 86 rearwardly in deck 1. As already described, operating slide 86 was previously rotated in the clockwise direction about pin 90 by coil spring 94, so that pin 92 of operating slide 86 is opposed to step 82 of cam opening 81 in rewind slide 75. Accordingly, when operating slide 86 moves rearwardly, rewind slide 75 is pushed by pin 92 of operating slide 86 into its rearward position shown in FIG. 22A.

With this movement of rewind slide 75, lock lever 105, whose pin 108 normally contacts the edge of rewind slide 75, is rotated in the clockwise direction about support pin 106 by coil spring 107, so that pin 108 moves into engagement with step 80 of rewind slide 75. Thus, rewind slide 75 is locked against the bias of coil spring 78 (see FIG. 1A). As a result, slide 75 pulls rewind push button 3 to its inner position to operate an associated switch (not shown) and place the recorded in the rewind mode so that the tape is rewound onto the cassette reel engaged with supply reel mount 24. Accordingly, in the automatic repeat operation, the rewind and reproducing operations are automatically repeated, after a preceding recording or reproducing operation has terminated and the end of the tape detected.

Although the apparatus of the present invention incorporates an automatic shut-off control, a shut-off prevention mechanism is also provided to prevent shut-off of the apparatus in the cue and review modes. This mechanism is shown most clearly in FIGS. 23A and 23B wherein it is seen that in the cue and review modes, fast forward push button 6 and rewind push button 3 are respectively depressed to temporarily transport the magnetic tape forward or backward, respectively. When one of these buttons is depressed to change into the cue or review modes, movement of the magnetic tape stops for an instant. The apparatus shown in FIG. 23 prevents the shut-off operation of the apparatus from taking effect during this instantaneous stop of the take-up reel mount.

In review operation, rewind push button 3 is depressed to move rewind slide 75, fixed to rewind push button 3, rearwardly in deck 1 by a relatively small distance while play push button 6 is depressed. For the cue operation, fast forward push button 6 is depressed to move forward fast forward slide 170 is moved rearwardly, its end pushing portion 171 pushes the end 169 of the second interconnecting lever 166 to rotate it in the counter-clockwise direction about pin 167 against the bias of coil spring 168. The bent portion 172 formed on the other end of second interconnecting lever 166 then pushes against the other arm of interconnecting lever 160 to rotate it in the clockwise direction about pin 162. Thus, interconnecting lever 160 is rotated in the clockwise direction about pin 162 in both the cue and review operations.

With this clockwise rotation of interconnecting lever 160, the stop 164 of the lever 160 is separated from the bent portion 175 of shut-off regulating lever 173. The latter is biased in the clockwise direction about support pin 167 by coil spring 174, and the pin 178 on detecting lever 39 is pushed by the edge 177 of shut-off regulating lever 173 so that a counter-clockwise rotational moment about support shaft 27 is applied to detecting lever 39.

In the same manner as in the reproducing mode, pin 44 of swinging lever 43 reciprocates between the right end of opening 42 and pocket 45. Since pin 44 does not enter pocket 47, detecting lever 39 does not respond to the instantaneous stop of the magnetic tape on the change-over into the cue mode or review mode and the shut-off operation is prevented.

The shut-off prevention mechanism is particularly effective for the review operation because reel mount 25 necessarily stop for an instant when the transport direction of the magnetic tape is reversed on the changeover into the review mode from the reproducing mode. If the shut-off prevention mechanism is not provided, the shut-off operation is effected on the change-over.

Figure 24A:
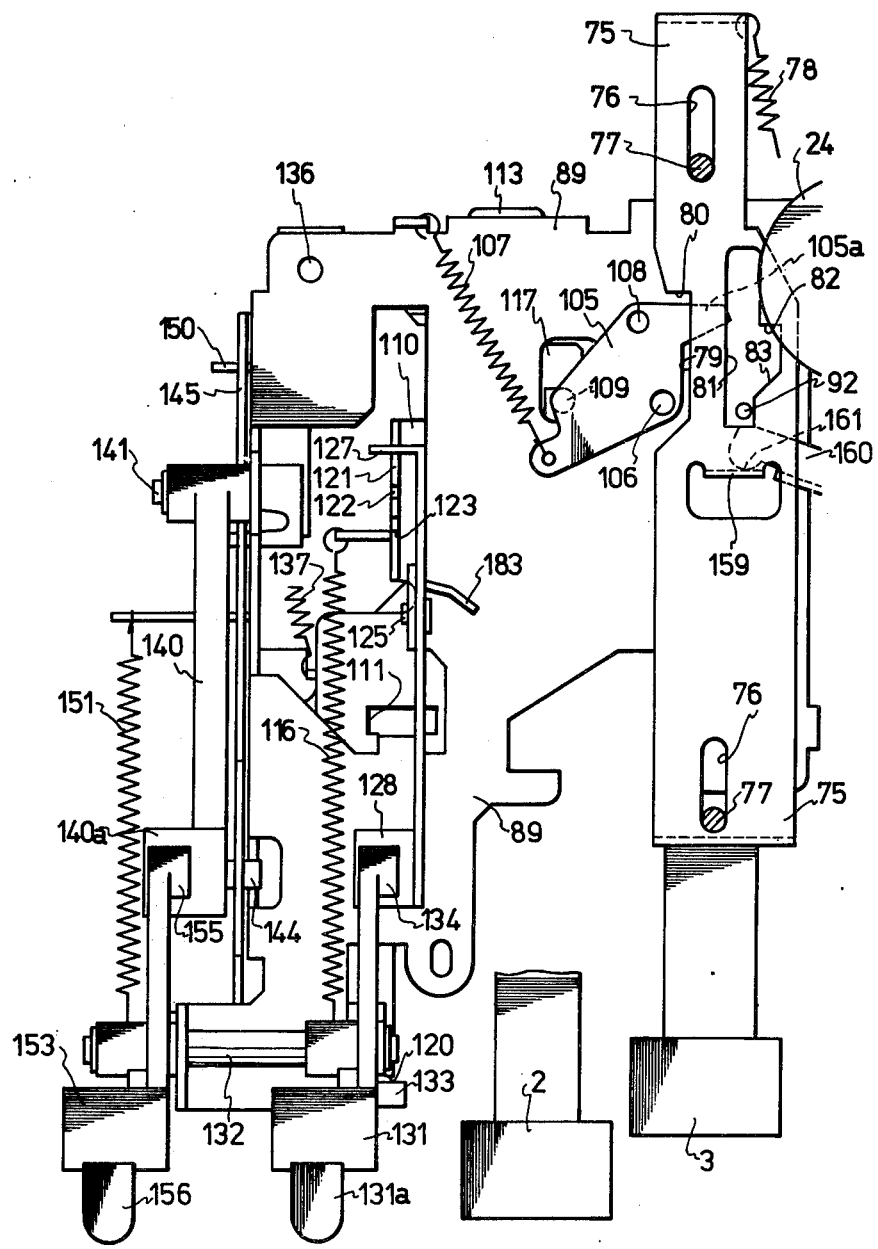
FIG. 24A and FIG. 24B, when assembled as shown in FIG. 33, is a plan view of the control mechanism of the present invention showing release of the shut-off prevention mechanism in the fast forward and rewind modes.
Figure 24B:
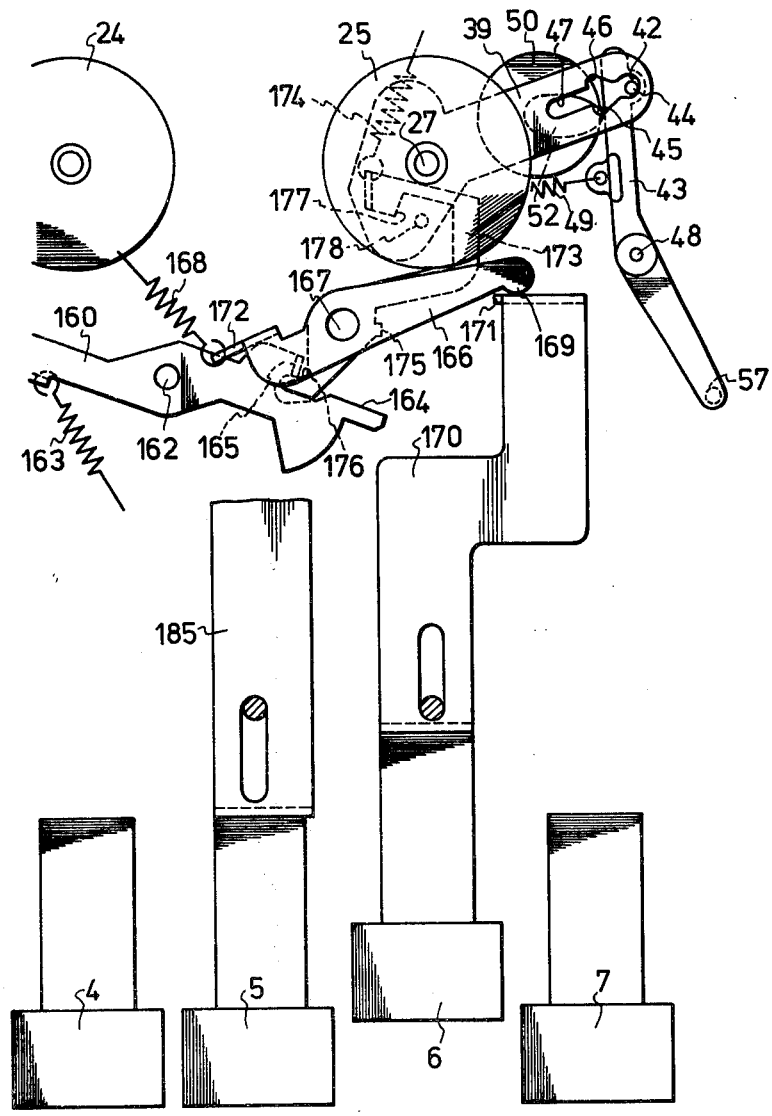
Figure 25:
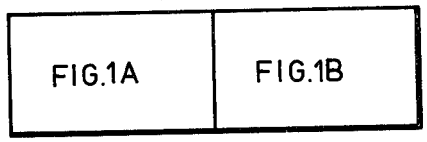
Figure 26:
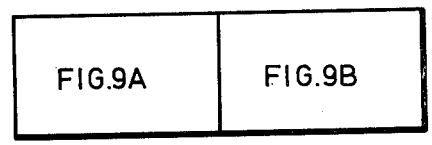
Figure 27:
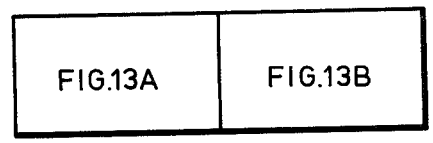
Figure 28:
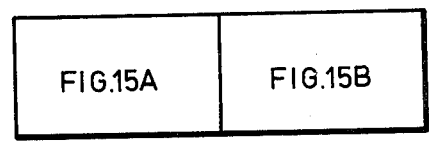
Figure 29:
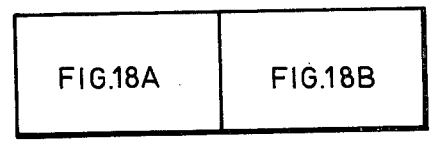
Figure 30:
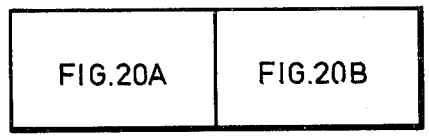
Figure 31:
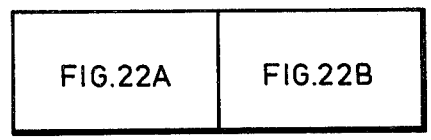
Figure 32:
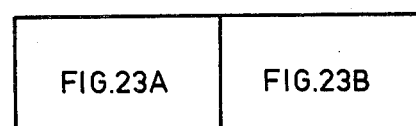
Figure 33:
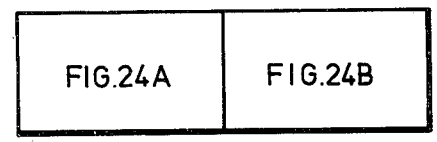

The shut-off prevention mechanism is designed to operate for the cue and review modes, but not for the fast forward and rewind modes. For the fast forward mode and the rewind mode, fast forward push button 6 and rewind push button 3 are depressed sufficiently to be locked by locking plate 14. The fast forward slide 170 and rewind slide 75 are then moved forward by a longer distance than in the cue and review modes, respectively, as shown in FIGS. 24A and 24B. Thus interconnecting lever 160 is rotated by a larger angle in the clockwise direction about support pin 162 against the bias of coil spring 163 directly by rewind slide 75, or through second interconnecting lever 166 by fast forward slide 170. With this larger rotation of interconnecting slide 160, pushing projection 165 of interconnecting slide 160 pushes the end 176 of shut-off regulating lever 173 in the counter-clockwise direction about support pin 167 against the bias of coil spring 174. Accordingly, the surface 177 of shut-off regulating lever 173 is separated from pin 178 of detecting lever 39 and no rotational moment is applied to detecting lever 39 by shut-off regulating lever 173. Thus, the shut-off operation can be effected when stoppage of the take-up reel is detected.

In the tape recorder of the present invention, the above-described control mechanism provides for automatic shut-off, the automatic rewind and automatic repeat operations, and a fast forward operation which can operate independently of each other. Accordingly, even during recording, reproducing or rewind operation, while the control is set in the automatic repeat or the automatic rewind mode, the cue operation can be effected by pushing fast forward push button 6.

However, when rewind operation is effected in the automatic repeat mode or in the automatic rewind mode, the review operation cannot be effected by pushing rewind push button 3, since that button and its associated rewind slide 75 are already locked in their depressed position by lock lever 105. For the rewind operation in the automatic repeat mode or the automatic rewind mode, rewind slide 75 is moved forward by a longer distance, so a head chassis (not shown) is moved a like distance to sufficiently separate the tape from the magnetic head mounted in the chassis so that review sound is not generated.

Although an illustrative embodiment of the present invention has been described herein with reference to the accompanying drawings, it is to be understood that this invention is not limited to that precise embodiment, but that various changes and modiffications can be effected therein by one skilled in the art without departing from the scope or spirit of this invention. Thus, for example, this invention can be applied to different types of recording and/or reproducing apparatus, for example, a video-tape recorder of the cassette type.

What is claimed is:

1. A tape recording and/or reproducing apparatus having reel mounts, for respectively supporting supply and take-up reels for a recording medium including means associated with one of said reel mounts for detecting stoppage of the reel mount as a result of all of the recording medium being wound on one of said reels; selectively operable change-over means for conditioning said apparatus to operate in an automatic shut-off, automatically rewind, or automatically repeat mode when the stoppage of said one reel mount is detected; and operating means for selectively placing said apparatus in a stop, record, play, rewind or fast forward mode to transport the recording medium from one reel to another and including control means responsive to said detecting means and said change-over means for controlling said operating means to place said apparatus in the operating mode selected by said change-over means when the detecting means detects stoppage of said one reel mount, and means for preventing change-over of said change-over means into the automatic rewind or automatic repeat operations when the play push button of the apparatus is not depressed.

2. A tape recording and/or reproducing apparatus having reel mounts for respectively supporting supply and take-up reels for a recording medium, including means associated with one of said reel mounts for detecting stoppage of the reel mount as a result of all of the recording medium being wound on one of said reels; selectively operable change-over means for conditioning said apparatus to operate in an autoatic shut-off, automatically rewind, or automatically repeat mode when the stoppage of said one reel mount is detected; and operating means for selectively placing said apparatus in a stop, record, play, rewind or fast forward mode to transport th recording medium from one reel to another and including control means responsive to said detecting means and said change-over means for controlling said operating means to place said apparatus in the operating mode selected by said change-over means when the detecting means detects stoppage of said one reel mount; and means for placing the apparatus in a fast forward operating mode independently of said operating means whereby said apparatus can be placed in a cue mode while conditioned by said control means for an automatic rewind or automatic repeat operation.

3. A tape recording and/or reproducing apparatus having reel mounts for respectively supporting supply and take-up reels for a recording medium, including means associated with one of said reel mounts for detecting stoppage of the reel mount as a result of all of the recording medium being wound on one of said reels; selectively operable change-over means for conditioning said apparatus to operate in an automatic shut-off, automatically rewind, or automatically repeat mode when the stoppage of said one reel mount is detected; and operating means for selectively placing said apparatus in a stop, record, play, rewind or fast forward mode to transport the recording medium from one reel to another and including control means responsive to said detecting means and said change-over means for controlling said operating means to place said apparatus in the operating mode selected by said change-over means when the detecting means detects stoppage of said one reel mount; a drive capstan and said control means including a pinion secured to said capstan for rotation therewith, a drive gear rotatably mounted in said apparatus adjacent said pinion, and a cam operatively connected to said drive gear for rotation therewith; a shut-off lever pivotally mounted in said apparatus in engagement with said cam for operating the control means and means for maintaining said lever in engagement with the cam whereby the lever is oscillated by the cam when said drive gear is rotated; said detecting means including means for preventing rotation of said drive gear during rotation of its associated reel with the tooth-less segment thereof adjacent said pinion and for releasing said drive gear for rotation when said one reel mount stops rotating; said cam having a predetermined configuration selected to permit said lever, under the influence of said maintaining means to rotate said drive gear when it is freed for rotation to engage the toothed portion of the drive gear with the pinion, whereby the drive gear is then driven by the pinion to oscillate the shut-off lever and operate said control means.

4. A recording and/or reproducing apparatus as defined in claim 3 including a radio control switch and means operatively engaged between said switch and said operating means for operating said radio control switch to shut off a radio connected thereto when said detecting means detects the stoppage of said one reel mount.

5. A recording and/or reproducing apparatus a defined in claim 3 wherein said one reel mount is located above said detecting means and said detecting means includes a detecting lever having an opening of predetermined generally cross-shaped configuration pivotally mounted in said apparatus, means for transmitting a rotational movement to said detecting lever, and a swinging lever pivotally mounted in the apparatus including a pin on one end thereof received in said opening in the detecting lever, and means for oscillating the swinging lever, said detecting lever receiving no rotational movement applied thereto when said reel mount stops whereby said pin on said detecting lever enters the portion of the opening nearest said one reel mount to permit a substantial swing of the swinging lever; said swinging lever being operatively engaged with said means for preventing rotation of the drive gear to release said preventing means when said pin enters said portion of the opening nearest said one reel mount.

6. A recording and/or reproducing apparatus as defined in claim 5 including means for preventing shut-off of said apparatus when rotation of the reel mount is stopped before all of the recording medium is wound on one of the reels during the cue and/or review modes of operation.

7. A recording and/or reproducing apparatus as defined in claim 6 wherein said shut-off preventing means comprises means for applying a rotational moment to said detecting lever when the rotation of said one reel mount is stopped in the cue or review modes of the apparatus whereby a rotational moment is applies to said detecting lever to prevent said pin from entering said portion of the opening in the detecting lever nearest said one reel mount.

8. A recording and/or reproducing apparatus as defined in claim 3 wherein said operating means includes a rewind push button, means for releasably locking the rewind push button in a depressed position, an operating member operatively connected to said rewind push button and slidably and rotatably mounted in said apparatus; and a lock release member operatively engaged between said operating member and said locking means for releasing the locking means in response to a predetermined sliding movement of said operating member in a readward direction in said apparatus, without rotation.

9. A recording and/or reproducing apparatus as defined in claim 8 wherein said operating member is operatively engaged with said shut-off lever to be moved by said lever in said rearward direction when the stoppage of said one reel mount is detected and said drive gear is driven by the pinion thereby to shut-off said apparatus.

10. A recording and/or reproducing apparatus as defined in claim 9 wherein said change-over means includes means for rotating said operating member from a normal first position engaged with said lock release member to a second position wherein the operating member is disengaged from said lock release member, whereby when said operating member is moved rearwardly by said shut-off lever the rewind push button is locked by said locking means and the apparatus is placed on the rewind mode, said operating means including means for restoring said operating member to its first position whereby when said detecting means detects stoppage of said one reel mount at the end of the rewind operation said rewind push button is released from said locking means and the apparatus is shut off.

11. A recording and/or reproducing apparatus as defined in claim 10 wherein said apparatus includes a play button selectively engaged with said locking means and said change-over means includes means for causing said operating member rotating means to rotate the operating member back to its second position after the rewind push button is released from said locking means whereby the apparatus is not shut off and the play push button remains engaged with the loading means to repeat signals recorded on the recording medium.

12. A recording and/or reproducing apparatus as defined in claim 10 including a radio control switch and means operatively engaged between said switch and said operating member for operating said switch to shut off a radio connected thereto when said operating member is moved rearwardly when stoppage of said one reel is detected at the end of said rewind operation.

* * * * *